(12) United States Patent
Grover

(10) Patent No.: US 8,334,895 B2
(45) Date of Patent: Dec. 18, 2012

(54) IMAGE CAPTURE AND PROCESSING USING CONVERGING RAYS

(75) Inventor: Trent N. Grover, Ames, IA (US)

(73) Assignee: Micoy Corporation, Ames, IA (US)

(*) Notice: Subject to any disclaimer, the term of this patent is extended or adjusted under 35 U.S.C. 154(b) by 0 days.

(21) Appl. No.: 13/008,021

(22) Filed: Jan. 18, 2011

(65) Prior Publication Data
US 2011/0109718 A1     May 12, 2011

Related U.S. Application Data

(62) Division of application No. 11/128,845, filed on May 13, 2005, now Pat. No. 7,872,665.

(51) Int. Cl.
*H04N 7/12* (2006.01)

(52) U.S. Cl. ........... 348/47; 348/42; 348/46; 348/48; 348/49; 348/50; 348/51; 348/52; 348/54

(58) Field of Classification Search ............ 348/42, 348/46–52, 54
See application file for complete search history.

(56) References Cited

U.S. PATENT DOCUMENTS

| | | |
|---|---|---|
| 3,187,339 A | 6/1965 | Clay |
| 3,357,770 A | 12/1967 | Clay |
| 3,953,869 A | 4/1976 | Wah Lo et al. |
| 4,063,265 A | 12/1977 | Lo et al. |
| 4,214,821 A | 7/1980 | Termes |
| 4,475,798 A | 10/1984 | Smith et al. |
| 4,525,038 A | 6/1985 | Muller |
| 4,868,682 A | 9/1989 | Shimizu et al. |
| 5,023,725 A | 6/1991 | McCutchen |
| 5,130,794 A | 7/1992 | Ritchey |
| 5,287,437 A | 2/1994 | Deering |
| 5,562,572 A | 10/1996 | Carmein |
| 5,650,813 A | 7/1997 | Gilblom et al. |

(Continued)

FOREIGN PATENT DOCUMENTS

DE     100 30 196 A1     1/2002

(Continued)

OTHER PUBLICATIONS

Aliaga, et al., "Plenoptic Stitching: A Scalable Method for Reconstructing 3D Interactive Walkthroughs", "International Conference on Computer Graphics and Interactive Techniques", 2001.

(Continued)

*Primary Examiner* — Sath V Perungavoor
*Assistant Examiner* — Geepy Pe
(74) *Attorney, Agent, or Firm* — Charles A. Lemaire; Lemaire Patent Law Firm, P.L.L.C.

(57) ABSTRACT

Apparatus and systems, as well as methods and articles, may operate to capture a portion of an omniscopic or omni-stereo image using one or more image capture media. The media may be located substantially perpendicular to a converging ray originating at a viewpoint on an inter-ocular circle and having a convergence angle between zero and ninety degrees from a parallel viewpoint baseline position that includes a non-converging ray originating at the viewpoint. The media may also be located so as to be substantially perpendicular to a non-converging ray originating at a first viewpoint at a first endpoint of a diameter defining an inter-ocular circle, wherein the origin of the non-converging ray gravitates toward the center of the inter-ocular circle as spherical imagery is acquired.

25 Claims, 14 Drawing Sheets

U.S. PATENT DOCUMENTS

| | | | |
|---|---|---|---|
| 5,657,073 A | 8/1997 | Henley |
| 5,668,595 A | 9/1997 | Katayama et al. |
| 5,703,604 A | 12/1997 | McCutchen |
| 5,721,585 A | 2/1998 | Keast et al. |
| 5,822,117 A | 10/1998 | Kleinberger et al. |
| 5,943,056 A | 8/1999 | Sato et al. |
| 5,946,077 A | 8/1999 | Nemirovskiy |
| 5,973,726 A | 10/1999 | Iijima et al. |
| 5,980,256 A | 11/1999 | Carmein |
| 5,982,375 A | 11/1999 | Nelson et al. |
| 6,002,430 A | 12/1999 | McCall et al. |
| 6,016,151 A | 1/2000 | Lin |
| 6,023,588 A | 2/2000 | Ray et al. |
| 6,031,540 A | 2/2000 | Golin et al. |
| 6,034,716 A | 3/2000 | Whiting et al. |
| 6,075,905 A | 6/2000 | Herman et al. |
| 6,097,854 A | 8/2000 | Szeliski et al. |
| 6,108,005 A | 8/2000 | Starks et al. |
| 6,112,033 A | 8/2000 | Yano et al. |
| 6,141,034 A | 10/2000 | McCutchen |
| 6,169,858 B1 | 1/2001 | Ray |
| 6,236,748 B1 | 5/2001 | Iijima et al. |
| 6,243,103 B1 | 6/2001 | Takiguchi et al. |
| 6,252,601 B1 | 6/2001 | Tanaka |
| 6,292,191 B1 | 9/2001 | Vaswani et al. |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,396,639 B1 | 5/2002 | Togino et al. |
| 6,469,710 B1 | 10/2002 | Shum et al. |
| 6,518,963 B1 | 2/2003 | Waupotitsch et al. |
| 6,522,325 B1 | 2/2003 | Sorokin et al. |
| 6,559,846 B1 | 5/2003 | Uyttendaele et al. |
| 6,639,596 B1 | 10/2003 | Shum et al. |
| 6,654,019 B2 | 11/2003 | Gilbert et al. |
| 6,665,003 B1 | 12/2003 | Peleg et al. |
| 6,683,608 B2 | 1/2004 | Golin et al. |
| 6,831,643 B2 | 12/2004 | Aliaga et al. |
| 6,947,059 B2 | 9/2005 | Pierce et al. |
| 6,975,322 B2 | 12/2005 | Lavelle |
| 7,015,954 B1 | 3/2006 | Foote et al. |
| 7,034,826 B1 | 4/2006 | Bronder |
| 7,095,418 B2 | 8/2006 | Levene et al. |
| 7,215,364 B2 * | 5/2007 | Wachtel et al. | 348/218.1 |
| 7,280,113 B1 | 10/2007 | Leung et al. |
| 2004/0001138 A1 | 1/2004 | Weerashinghe et al. |

FOREIGN PATENT DOCUMENTS

| | | |
|---|---|---|
| JP | 07-140569 | 6/1995 |
| WO | WO 9621197 A1 | 7/1996 |
| WO | WO 9917543 A1 | 4/1999 |
| WO | WO 0244808 A2 | 6/2002 |
| WO | WO 2005067318 | 7/2005 |

OTHER PUBLICATIONS

Bourke, "Stereoscopic 3D Panoramic Images", "http://local.wasp.uwa.edu.au/-pbourke/projection/stereopanoramic/", 2004.

Charles, Jeffrey R., "Polar Projection and X-Y Omnidirectional Images", "http://www.versacorp.com/vlink/product/polxyimg.htm/", Mar 30, 2000 obtain.

Charles, Jeffrey R., "Portable All-Sky Reflector with 'Invisible' Axial Camera Support", 1987, p. 12, Publisher: http://www.versacorp.com/versalink_fld/jcarticle_fld/allsky.htm.

Chen, "QuickTime VR—An Image-Based Approach to Virtual Environment Navigation.", "ACM Special Interest Group on Computer Graphics and Interactive Techniques.", 1995., pp. 29-38.

Chen, Y.P. , "Landscape Generation: A Changing Prospective ", "ESD: The Electronic System Design Magazine", Feb. 1988, p. 44-48, vol. 18.

Fisher, "Viewpoint Dependent Imaging: An interactive Stereoscopic display", "Processing and Display of Three-Dimensional Data, Proc. of SPIE", 1982, vol. 367.

Foley, et al., "Computer Graphics: Principles and Practice", 1997, pp. 237-242, 253, 915, 916, Publisher: Addison-Wesley Pub. Co.

"Globuscope Panoramic Camera (advertisement)", "http://www.everent.com/globus/", Mar 30, 2000 obtain.

Li, et al., "Spherical Stereo for the Construction of Immersive VR Environment.", "Proceedings of the IEEE Virtual Reality Society", Mar. 2005, pp. 217-328.

Peleg, et al., "Omnistereo: Panoramic Stereo Imaging.", "IEEE Transactions on Pattern Analysis and Machine Intelligence.", Mar. 2001, pp. 279-290, vol. 23, No. 3.

Praun, et al., "Spherical Parametrization and Remeshing. International Conference on Computer Graphics and Interactive Techniques.", 2003.

Pritch, Y., et al., "Automatic Disparity Control in Stereo Panoramas (OmniStereo)", "Omnidirectional Vision, Proceedings.", Jun. 12, 2000, p. 8.

Slater, Dan , "A full sphere camera for point of view and VR photography", "http://www.nearfield.com/SPHERECA/spherecam.htm", 2001, p. 11.

Szeliski, "Video Mosaics for Virtual Environments.", "IEEE Computer Graphics and Applications", Mar. 2, 1996, vol. 16, No. 2.

* cited by examiner

IMAGE CAPTURE AND PROCESSING USING CONVERGING RAYS

RELATED APPLICATIONS

This application is a divisional of U.S. patent application Ser. No. 11/128,845 filed May 13, 2005, titled "Image Capture and Processing" (which issued as U.S. Pat. No. 7,872,665 on Jan. 18, 2011), which is incorporated herein in its entirety by reference.

This disclosure is related to U.S. patent application Ser. No. 11/128,712, titled "Image Processing and Display," filed on May 13, 2005 (which issued as U.S. Pat. No. 7,656,403 on Feb. 2, 2010), assigned to the assignee of the embodiments disclosed herein, Micoy Corporation, and incorporated herein by reference in its entirety.

TECHNICAL FIELD

Various embodiments described herein relate to image processing generally, including apparatus, systems, and methods used to capture, process, and display image information.

BACKGROUND INFORMATION

Omni-stereo imaging research may involve the capture and display of stereoscopic (stereo) three-dimensional imagery for substantially all of an environment (omni), including one or more spherical images. Many techniques have been developed for capturing omni-directional monoscopic imagery of an environment using wide-angle lenses, mirrors, and various image mosaicing techniques. Similarly, many techniques have been developed for capturing stereoscopic imagery. There are even some techniques that can be used to capture stereoscopic omni-directional (omni-stereo) imagery.

Early attempts made use of two monoscopic omni-directional cameras vertically displaced along a common axis. By comparing the imagery from both cameras, depth information could be extracted from the surrounding scene. However, human eyes are horizontally displaced, rather than vertically, so the omni-stereo imagery produced by the vertical camera arrangement is inappropriate for human stereo perception.

Some techniques rely on specially constructed spiral mirrors and/or lenses. While these devices theoretically are capable of capturing omni-stereo imagery in real time, they are cylindrical, rather than spherical, in nature. Thus, they may capture 360° of imagery in the horizontal direction, but are more limited in the vertical direction, and usually unable to capture more than 90° of vertical imagery. While some of these theoretical formulations have been extrapolated into a spherical context, the resulting spherical omnivergent images are designed for automated stereo reconstruction operations, rather than human stereoscopic viewing.

Another approach, using a center-strip omnivergent sensor, can be applied more directly to human stereoscopic viewing. This sensor captures a succession of circular imaging sweeps and merges them into a unified panoramic image. Thus, a camera may be placed at successive positions around a circle, and at each position, the camera can be rotated 360° about its central axis (coinciding with a radius of the circle), so as to capture a full circle of image data. This process results in a unified panoramic image containing both forward and backward tangent rays. Decomposing the image into separate forward and backward tangent ray images permits stereoscopic viewing when one image is shown to each eye of the viewer. However, this approach also fails to capture some of the image data.

Spherical imagery is usually displayed to a human viewer by mapping images onto a spherical surface that surrounds the viewer. The viewer can then change the viewing direction interactively to explore the environment. However, when images provided by a center-strip omnivergent sensor are viewed in this manner, it becomes apparent that the tangential camera path results in a failure to capture the areas of the surrounding environment corresponding to the top and bottom apexes of the spherical field of view—that is, some areas near the apexes of the sphere are simply missing. Thus, omniscopic and stereoscopic viewing of such imagery is flawed at the apexes (e.g., above the viewer's head, and at the viewer's feet). The use of toroidal topology for panoramic imagery also fails to solve such apex viewing flaws.

DETAILED DESCRIPTION

Figure 1A:
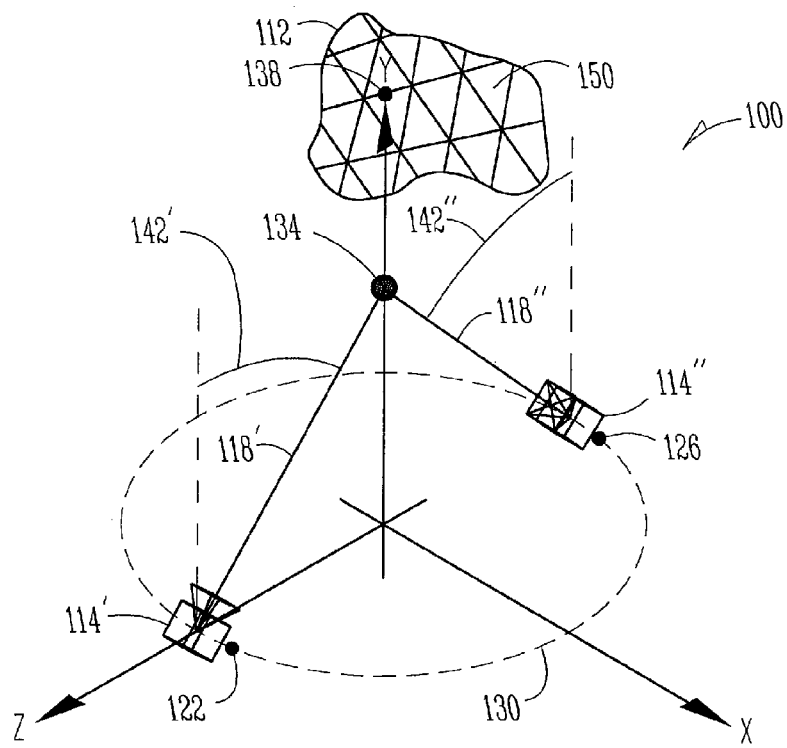
FIGS. 1A-1F illustrate converging ray image capture apparatus according to various embodiments of the invention.

The distortion of images discussed previously is caused by collecting apex image data from a multitude of different viewing positions. Even though all of the image capture rays for a given apex may be oriented in the same direction (directly up or down), their origins are displaced from one another around the specified inter-ocular circle. As such, each apex capture ray is pointing toward a slightly different location in the surrounding environment.

Various embodiments disclosed herein may address the challenge of re-orienting apex capture rays by changing the manner in which images are captured. Thus, some embodiments disclosed herein make use of cameras and other image capture media oriented to take advantage of converging capture rays. Others use capture media located so as to make use of capture rays having origins that gravitate toward the center of the inter-ocular circle. It should be noted that the term "camera" and "image capture medium" are used interchangeably throughout the following discussion, and both terms refer to devices that can be used to capture image information from the surrounding environment, converting light energy to electrical signals, such as CCDs (charge-coupled devices) arrays, CMOS (complementary metal-oxide semiconductor) sensor arrays, etc. In the case of embodiments where images are generated by computer, rather than captured from the surrounding physical environment, image capture media may comprise one or more registers, buffers, or other memories to store image pixel information. In such embodiments, there may be no need to transfer image information to a separate image storage medium.

FIGS. 1A-1F illustrate converging ray image capture apparatus 100 according to various embodiments of the invention. These figures demonstrate that spherical images 112 may be captured by locating image capture media 114', 114" so that apex capture rays (converging rays 118', 118") point to the same location in the surrounding environment. Thus, as the media 114', 114" are swept along a variety of paths to capture the spherical image 112, the path of each medium 114', 114" may be altered so that the converging rays 118', 118" (substantially perpendicular to the image capture media 114', 114" and originating at two viewpoints 122, 126 on an inter-ocular circle 130) ultimately converge at a convergence point 134 directly above or below the applicable apex 138. Thus, in FIG. 1A, once the location of a convergence point 134 is determined, the associated convergence angle 142', 142" may be found for the desired apex 138.

Figure 1B:
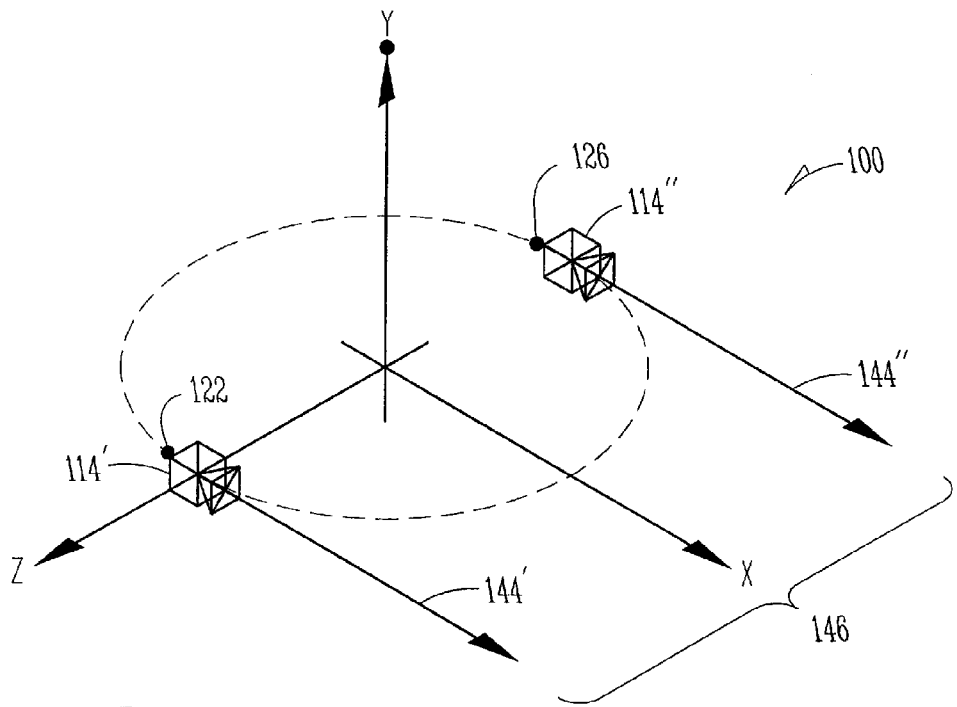

FIG. 1B illustrates the parallel viewpoint baseline position 146 (e.g. yaw=0 and pitch=0) that includes non-converging rays 144', 144" originating at the first viewpoint 122 and the second viewpoint 126.

Figure 1C:
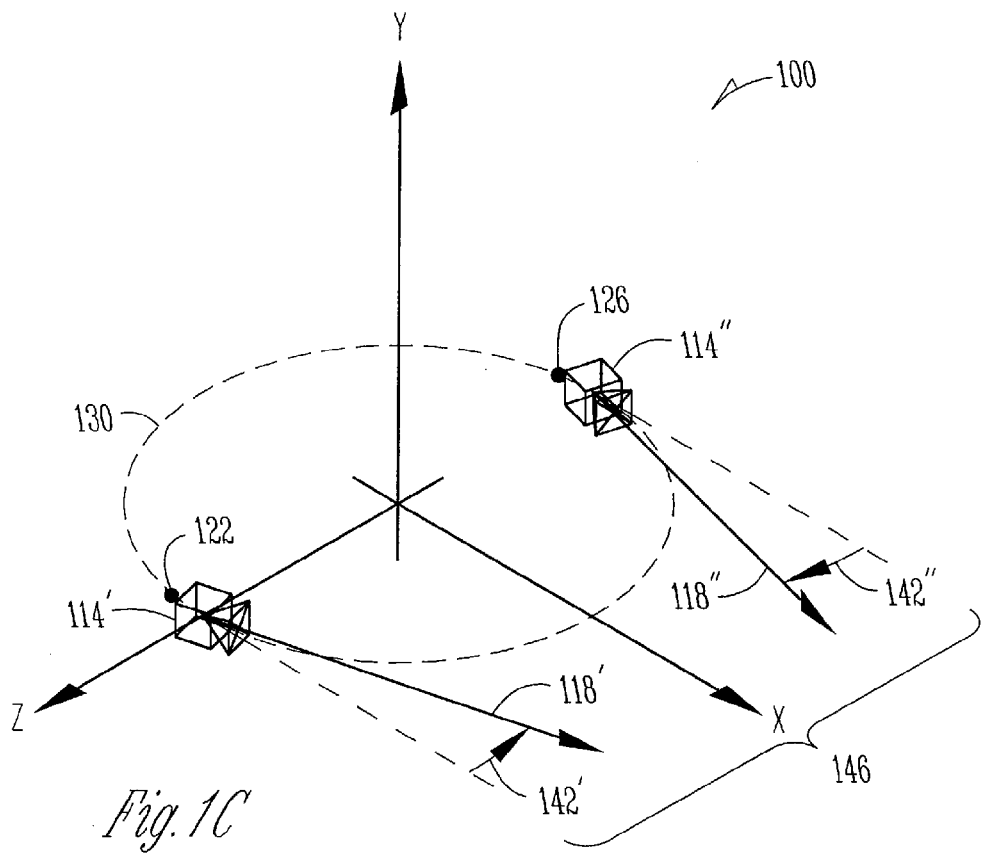

In FIG. 1C, convergence adjustment is demonstrated by rotating each convergence ray 118', 118" by the desired convergence angle 142', 142" about the ray origin 122, 126. It should be noted that in many embodiments, as will be discussed in further detail below, the convergence rays 118', 118" may be rotated continuously, or in increments (e.g., by a portion of the convergence angle 142', 142") throughout spherical image capture operations, such that the convergence rays 118', 118" may be characterized by a convergence angle 142', 142" near zero degrees at the equator of the sphere (pitch=0 degrees), the full convergence angle at the apex of the sphere (pitch=90 degrees), and somewhere in between at other pitch angles.

Thus, camera sweep operations may be initiated by using a first image capture medium 114' (located substantially perpendicular to a converging ray 118' originating at a first viewpoint 122 on the inter-ocular circle 130) having a convergence angle 142' between zero and ninety degrees from a parallel viewpoint baseline position 146'. In this manner, spherical image data, such as a triangular portion 150 of an omnistereoscopic image 112, may be acquired.

Figure 1D:
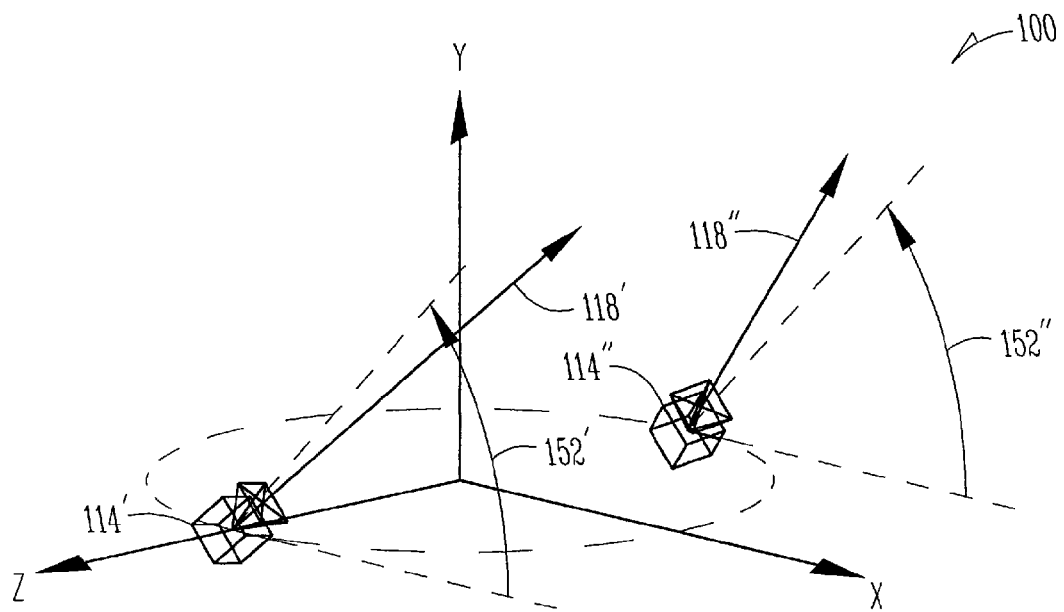
Figure 1E:
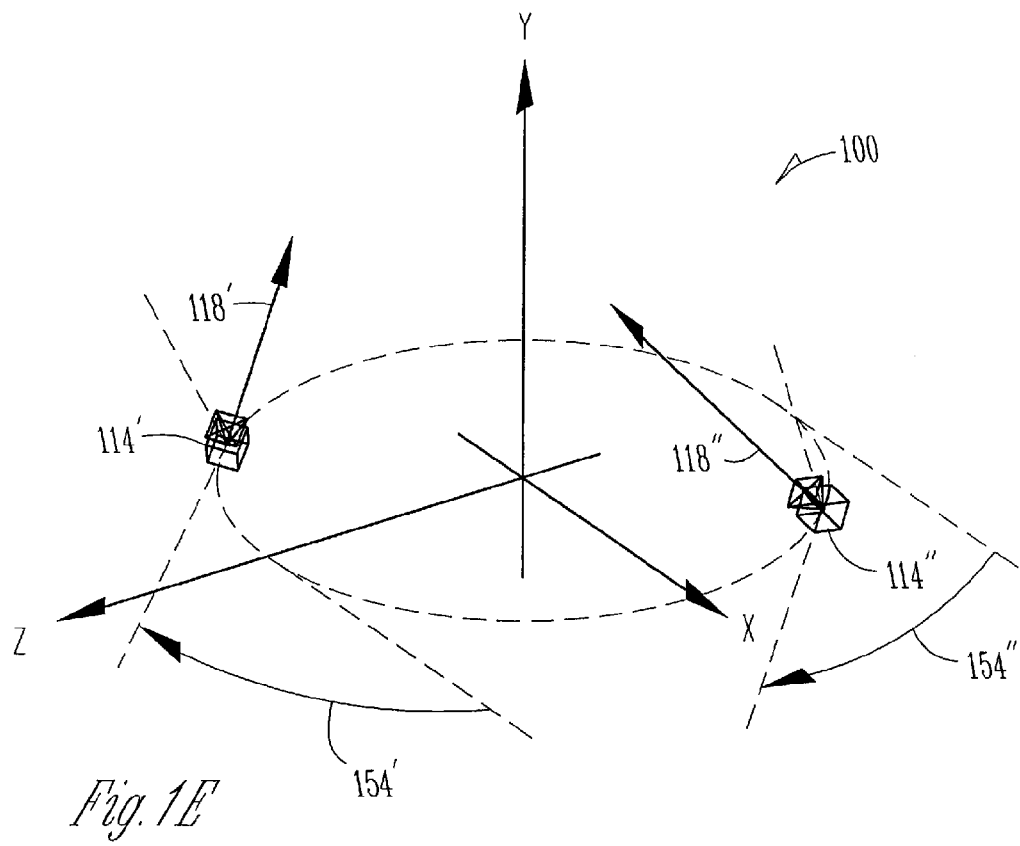
Figure 1F:
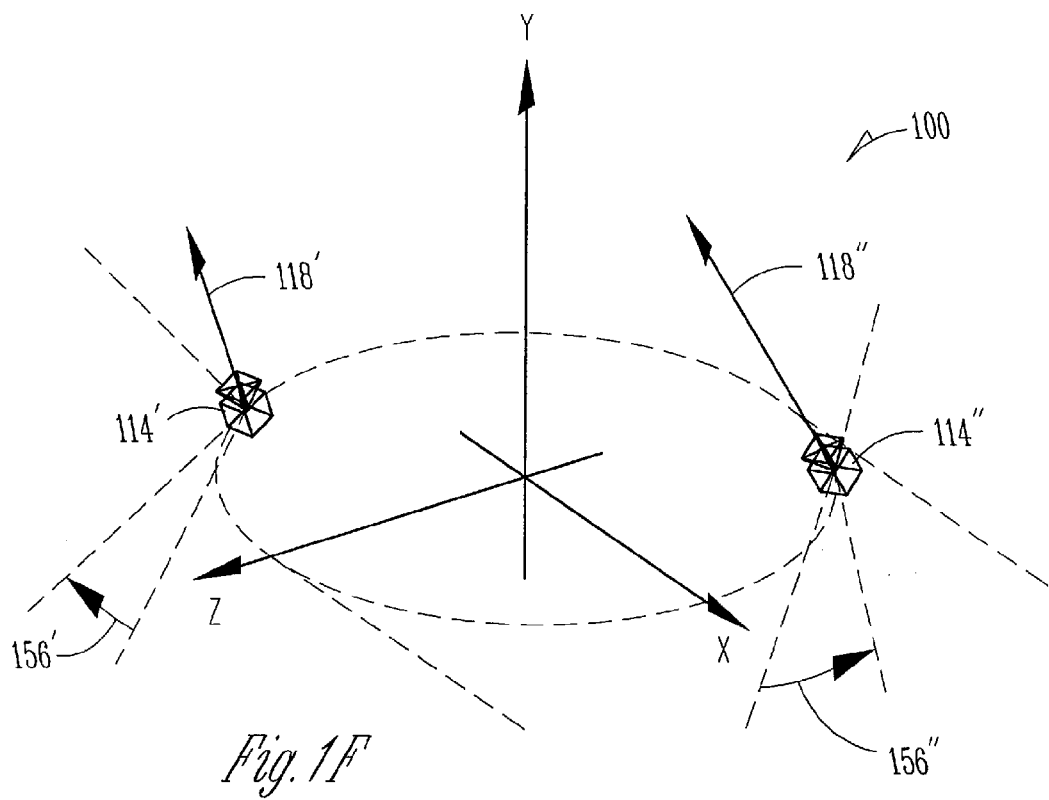

In FIG. 1D it can be seen that pitch adjustments during camera sweep operations can be made to the capture media 114', 114" by rotating each converging ray 118', 118" by the desired pitch angle 152', 152" about the Z-axis. In FIG. 1E it can be seen that yaw adjustments during camera sweep operations can be made to the capture media 114', 114" by rotating each converging ray 118', 118" by the desired yaw angle 154', 154" about the Y-axis.

In some instances, particularly when the apex convergence point 134 is extremely close to the image capture device (e.g., capture media 114', 114"), some twisting of the image at the apex may be visible upon display of the captured image data. Compensation for the twisting effect can be made by further yaw correction to the camera sweep paths. Thus, in FIG. 1F it can be seen that twist adjustments during camera sweep operations can be made to the capture media 114', 114" by rotating each converging ray 118', 118" by the desired twist angle 156', 156" about the y-axis (e.g., the twist angle may be approximately equal to the convergence angle 142', 142" then in effect, or some selected portion thereof). It should be noted that the twist correction may be made in the opposite direction to the orientation yaw angle 152', 152" (e.g., the twist correction may be in opposite directions for each eye, so for one eye, the twist correction is in the same direction as the yaw correction, and for the other eye, it's in the opposite direction, thus, the capture medium for one eye may have a positive twist correction applied, and the capture medium for the other eye may have a negative twist correction applied). Thus, while yaw and pitch adjustments that serve to orient the image capture media 114', 114" properly for spherical image capture tend to push the converging rays 118', 118" toward convergence, twist correction tends to move them back—away from convergence. However, the net effect is typically an ultimate orientation yaw angle that is not zero.

Since the convergence technique maintains apex capture ray origins along the specified inter-ocular circle, accurate stereoscopic separation can be maintained throughout the resulting panorama. When viewing the panoramic images stereoscopically, the effect achieved may include parallel eye orientation at the sphere's equator, with slowly converging eye orientation as the apexes of the sphere are approached. Such convergence is unobtrusive to the viewer because a similar effect occurs naturally when a human being focuses their vision on a particular object. The capture ray convergence technique operates most effectively to provide a substantially seamless panorama if the converging capture rays converge to a certain point in the surrounding space, which is typically the closest object surface point that lies directly above or below the appropriate apex.

Figure 2A:
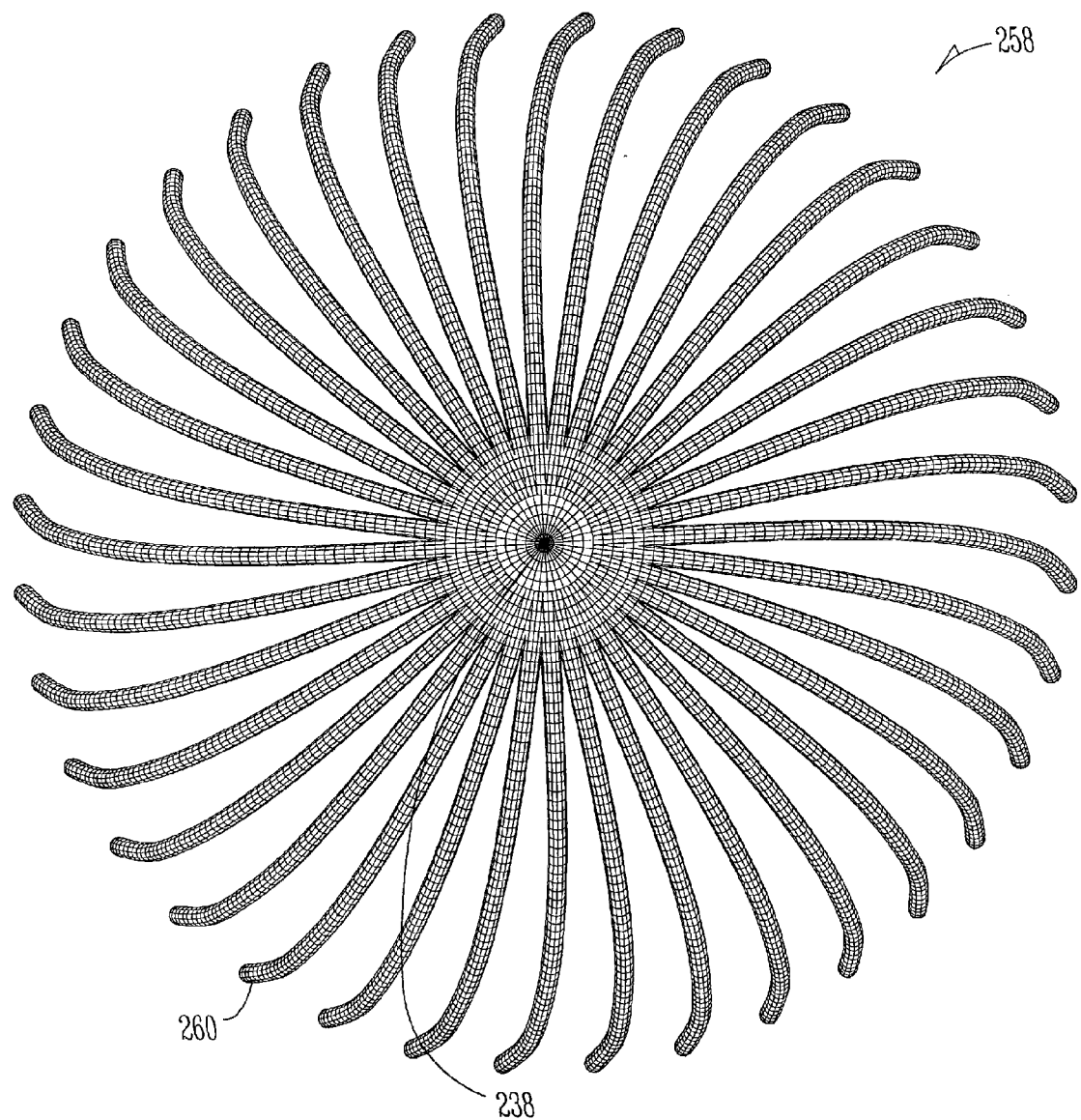
FIGS. 2A-2B illustrate top and perspective views, respectively, of converging ray camera sweep paths according to various embodiments of the invention.
Figure 2B:
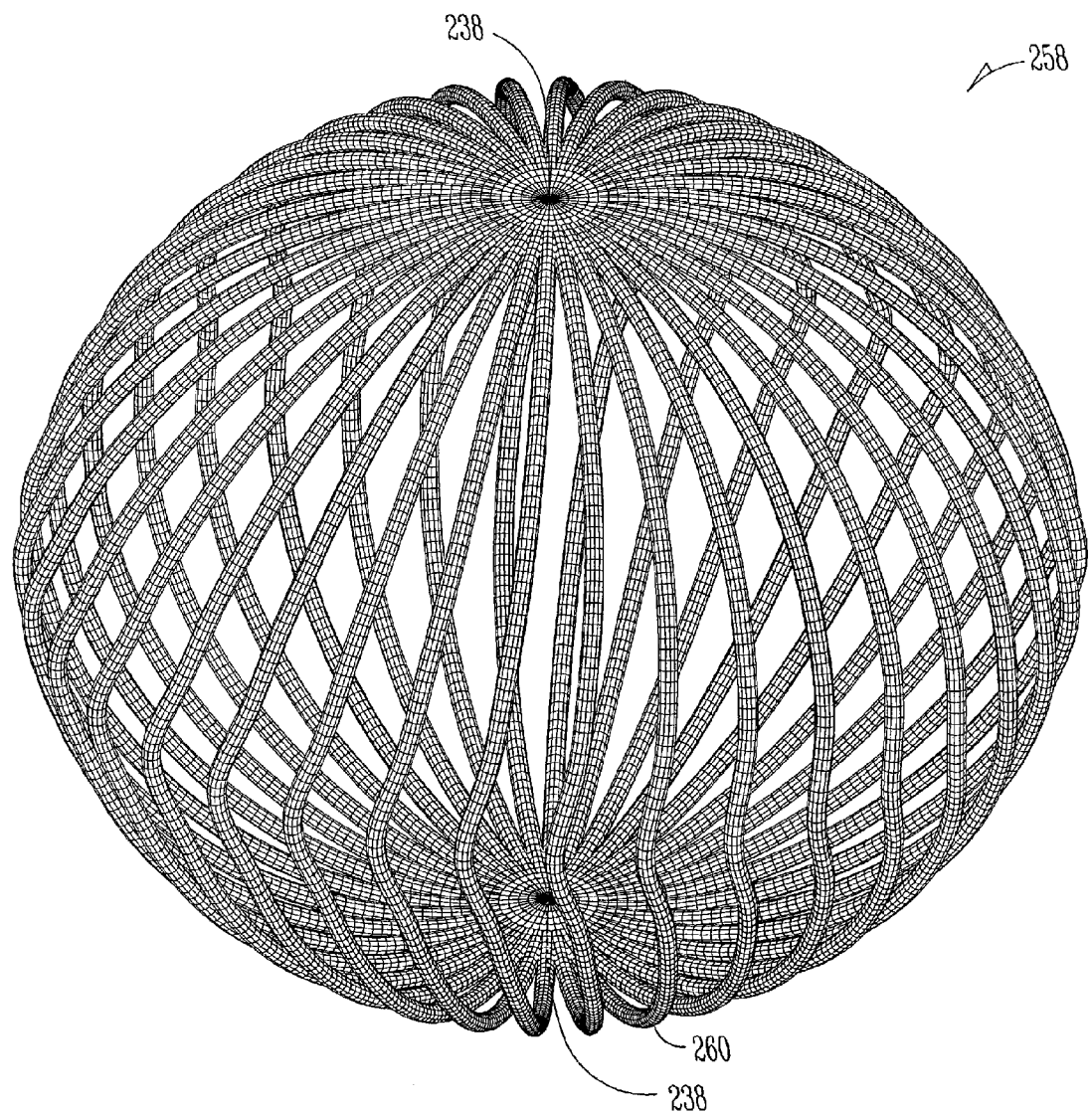

FIGS. 2A-2B illustrate top and perspective views, respectively, of converging ray camera sweep paths 258 according to various embodiments of the invention. Thus, the camera positions (or capture media positions) may begin at a parallel baseline position (see FIG. 1B), with a convergence angle 142', 142" (see FIG. 1C) of about zero degrees (e.g, greater than zero degrees), and then the convergence angle 142', 142" may be varied according to some formula from about zero degrees (e.g., greater than zero degrees) to an ultimate angle that results in intersection at the convergence point 134 (see FIG. 1A). This convergence operation can be performed as the cameras are swept through a series of pitch, yaw, and twist orientations (see FIGS. 1C-1F) while spherical imagery 112 is captured. Changes made to the convergence angle 142', 142" during spherical image capture operations may be accomplished according to simple linear interpolation or using more complex mathematical models (e.g. quadratic, logarithmic, etc). The convergence angle 142', 142" may thus be adjusted across the entire 90° camera inclination sweep approaching the apex 238, as shown in FIGS. 2A and 2B, or across a smaller section of the sweep, as desired. The same capture medium 114', physically moving along a sweep path 260, or a plurality of stationary media 114', 114", located along the sweep path 260, or some combination of these, may be used to acquire spherical image data during sweep operations.

Figure 3A:
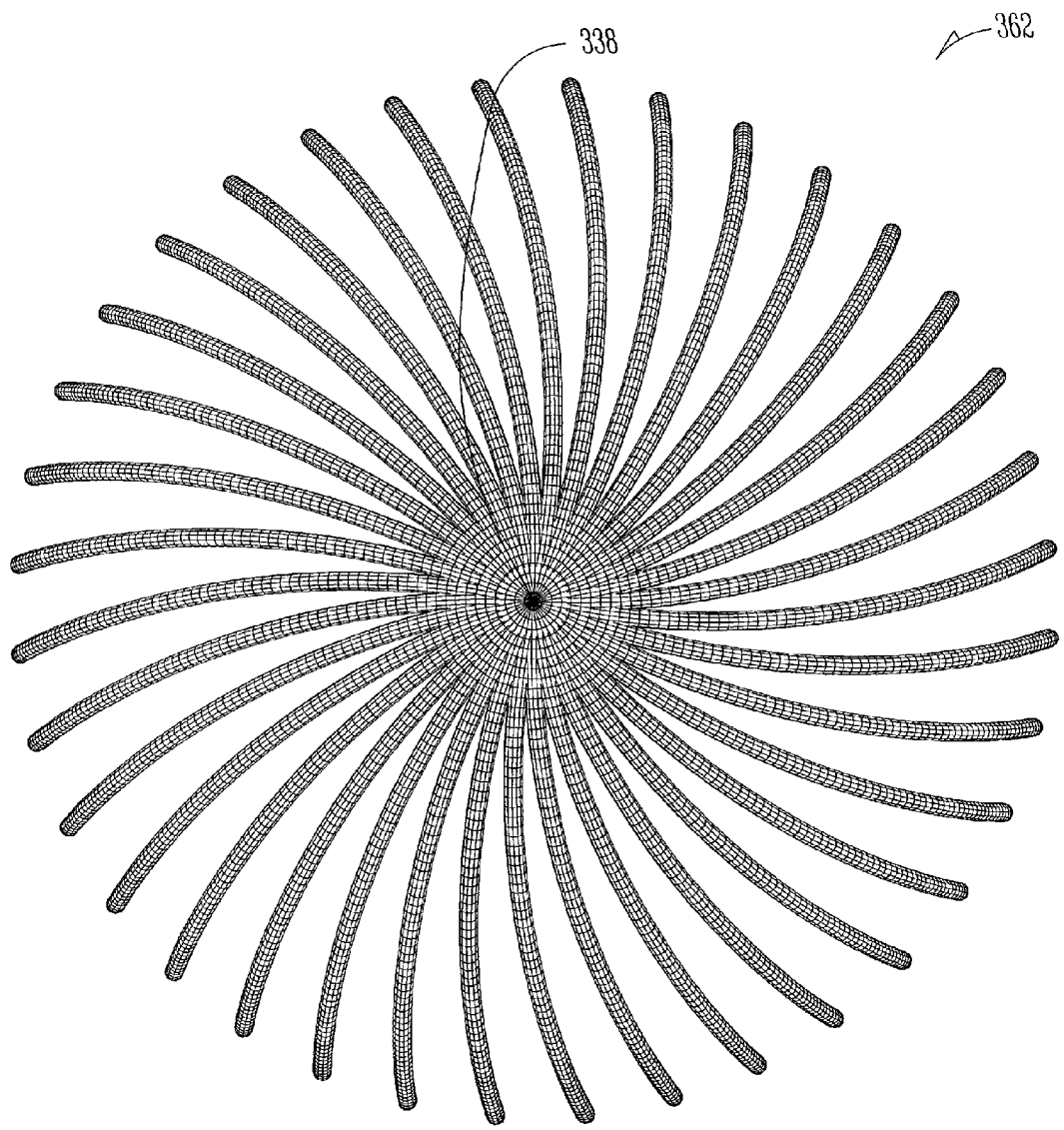
FIGS. 3A-3B illustrate top and perspective views, respectively, of twist-corrected converging ray camera sweep paths according to various embodiments of the invention.
Figure 3B:
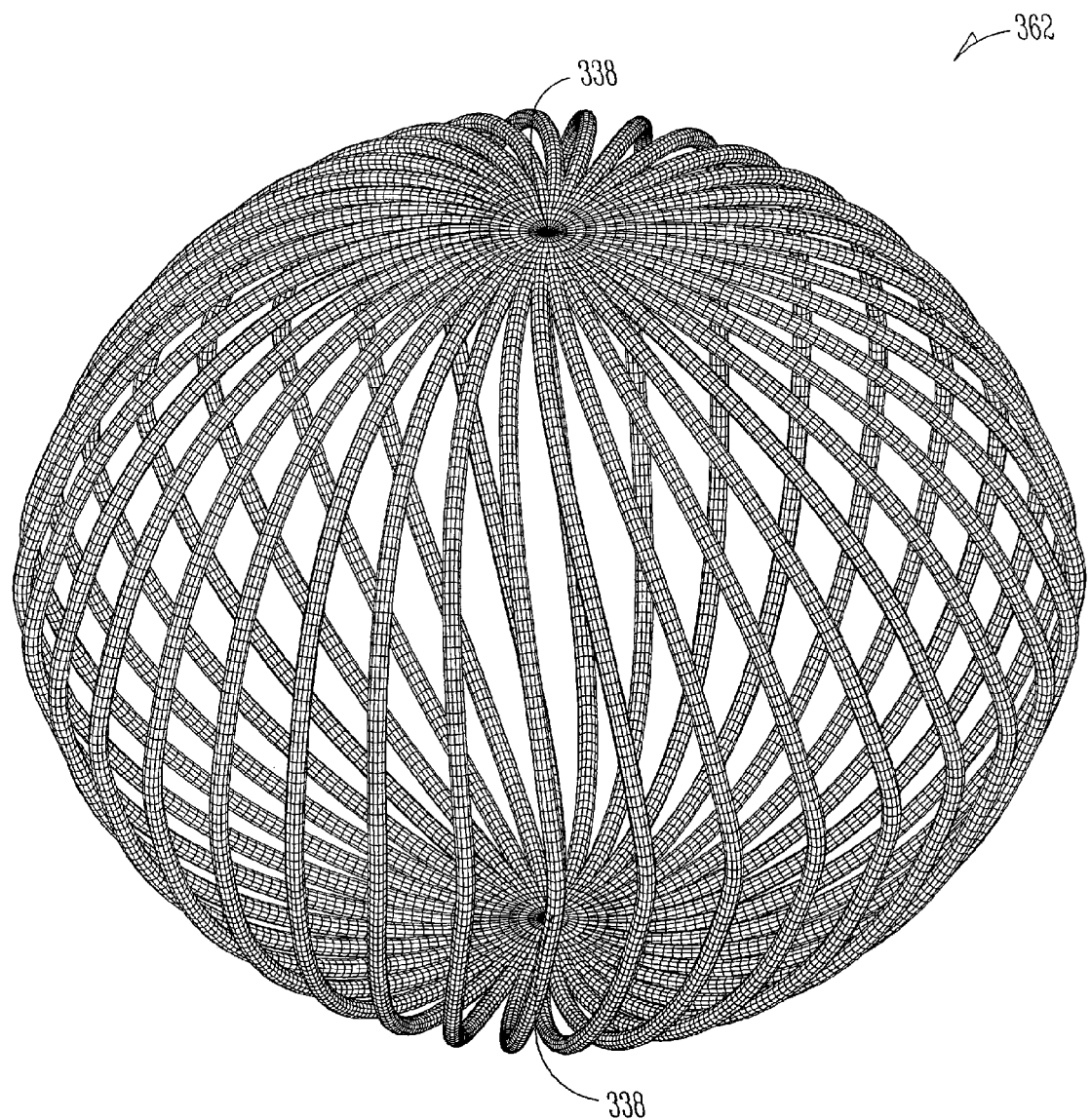

FIGS. 3A-3B illustrate top and perspective views, respectively, of twist-corrected converging ray camera sweep paths 362 according to various embodiments of the invention. As noted previously when the convergence point is very close to the image capture media, some twisting of the image data at the apex may be visible upon display. Compensation for the twisting effect may be accomplished using additional yaw correction (see FIG. 1F), and FIGS. 3A and 3B illustrate one possible set of camera sweep paths 362 after yaw correction to compensate for the twist effect has been applied.

The capture ray convergence technique operates well when accurate information about the surrounding scene is available, so that various capture ray orientations (effected by the capture media location) may be properly implemented. Thus, the convergence approach lends itself to use in computer graphics environments, where the convergence information is readily available. However, convergence operations may be less useful with respect to the use of physical image capture devices because it can be difficult to create a device that adjusts to constantly varying apex convergence points. The resulting spherical imagery may exhibit undesirable apex distortion whenever the properties of the surrounding environment conflict with the chosen convergence point.

As mentioned briefly above, the gravitation technique may also be used to capture spherical imagery. Instead of moving the capture ray orientations toward convergence, this technique involves the gravitation or movement of capture ray origins (i.e., gravitating rays) from the inter-ocular circle diameter endpoints toward the center of the inter-ocular circle as the capture media sweep out their imaging capture paths.

Figure 4A:
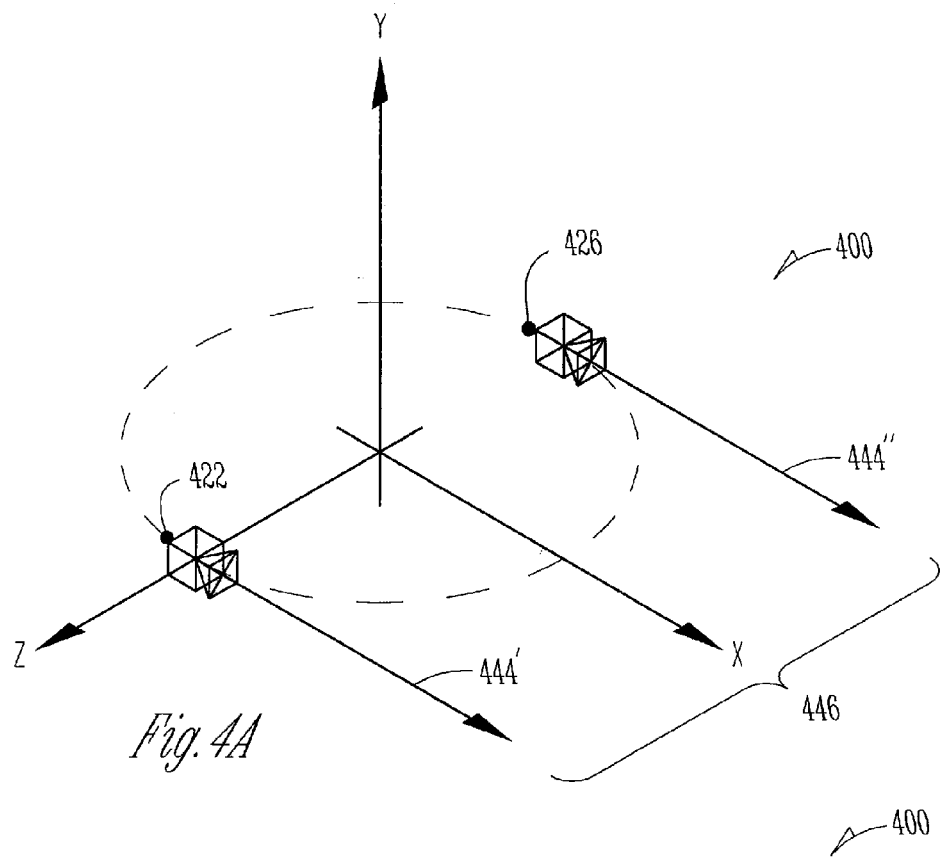
FIGS. 4A-4D illustrate gravitating ray image capture apparatus according to various embodiments of the invention.

FIGS. 4A-4D illustrate gravitating ray image capture apparatus 400 according to various embodiments of the invention. FIG. 4A illustrates the parallel viewpoint initial baseline position 446 (e.g. yaw=0 and pitch=0) that includes non-converging rays 444', 444" originating at the first viewpoint 422 and the second viewpoint 426.

Figure 4B:
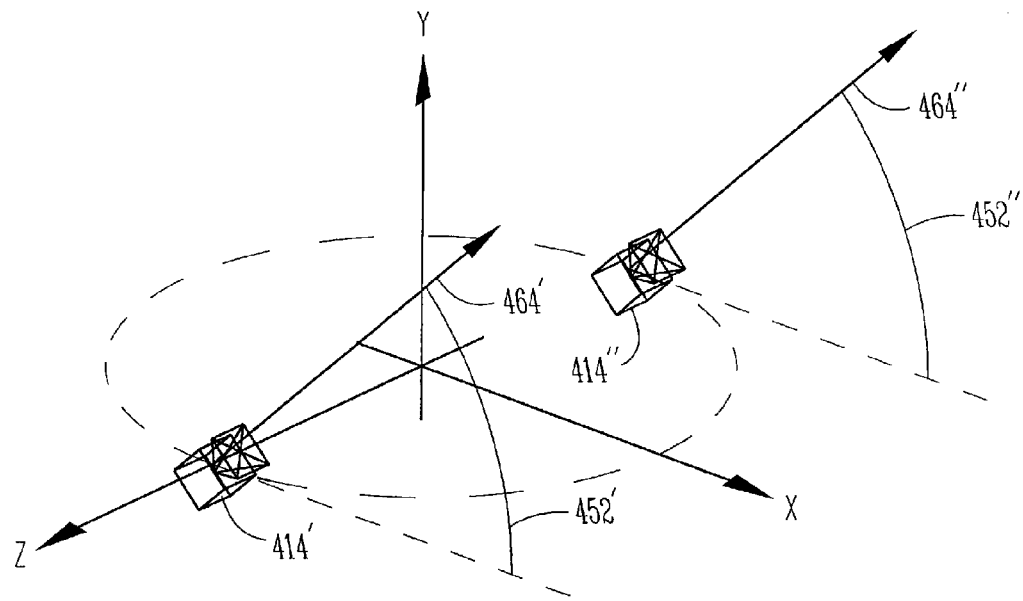
Figure 4C:
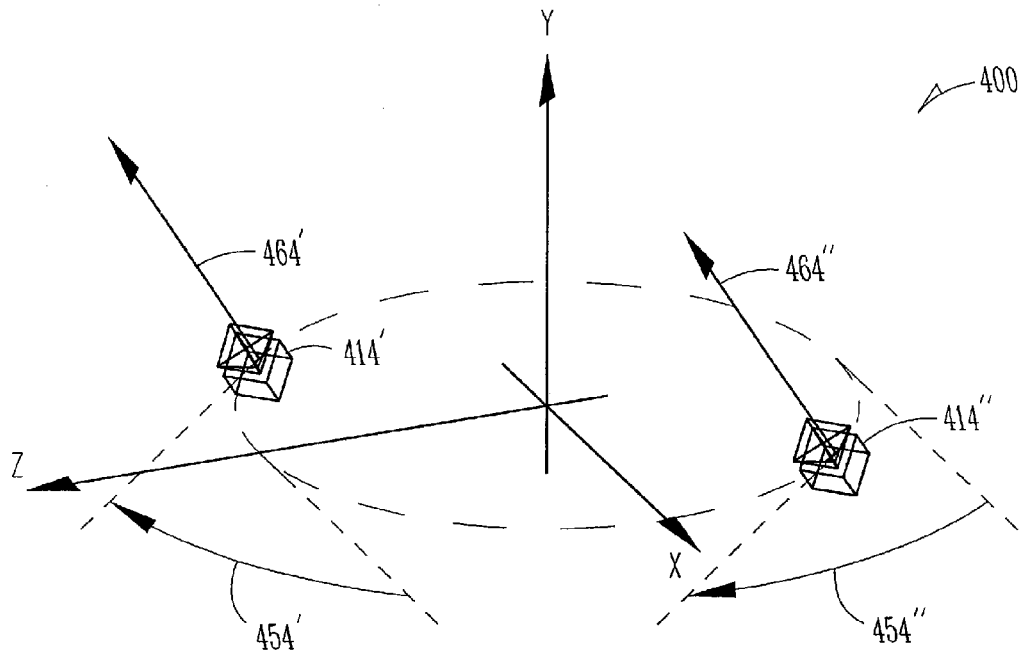

In FIG. 4B it can be seen that pitch adjustments during camera sweep operations can be made to the capture media 414', 414" by rotating each gravitating capture ray 464', 464" by the desired pitch angle 452', 452" about the Z-axis. In FIG. 4C it can be seen that yaw adjustments during camera sweep operations can be made to the capture media 414', 414" by rotating each gravitating capture ray 464', 464" by the desired yaw angle 454', 454" about the Y-axis.

Figure 4D:
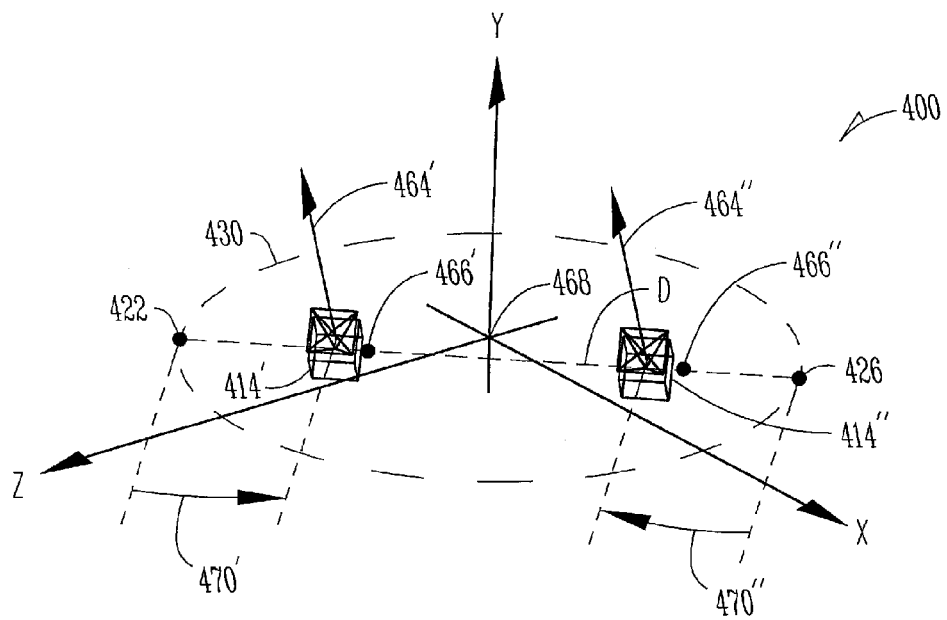

In FIG. 4D, it is shown that gravitating capture ray 464', 464" origin 466', 466" adjustment may be accomplished by moving the capture media 414', 414" (and thus, the origins 466', 466" of the gravitating capture rays 464', 464") away from the first and second viewpoints 422, 426 toward the center 468 of the inter-ocular circle 430 along the diameter D by some desired inter-ocular distance portion 470', 470".

Thus, spherical images may be acquired by capturing a first portion of an image, such as a monoscopic image, a stereoscopic image, or an omni-stereoscopic image, using an image capture medium 414' oriented so as to be substantially perpendicular to a non-converging ray 444' originating at a first viewpoint 422 coinciding with a first endpoint of a diameter D defining an inter-ocular circle 430, and capturing a second portion of the spherical image using the same image capture medium 414' (or another medium 414') substantially perpendicular to a non-converging ray 444' originating at a first point 466' of the diameter D between the first endpoint 422 and the center 468 of the inter-ocular circle 430.

Thus, as is the case with the convergence technique, the gravitational technique can make use of the same capture medium, physically moving along a sweep path, or a plurality of stationary media, located along the sweep path, or some combination of these, to acquire image data. In the case of implementing either convergence or gravitation spherical image capture techniques, it should be noted that image capture media pitch and yaw values may be used help to locate the acquisition planes of the image capture media in space. That is, spherical images may comprise image information that is associated with a distinct set of rays corresponding to a series of yaw (−180° to 180°) and pitch values (−90° to 90°). This information can be used to locate and orient (i.e., "point") the image capture media during capture operations, or when recorded along with acquired image data, to determine where the image capture media were located at the time of image capture activities.

Figure 5A:
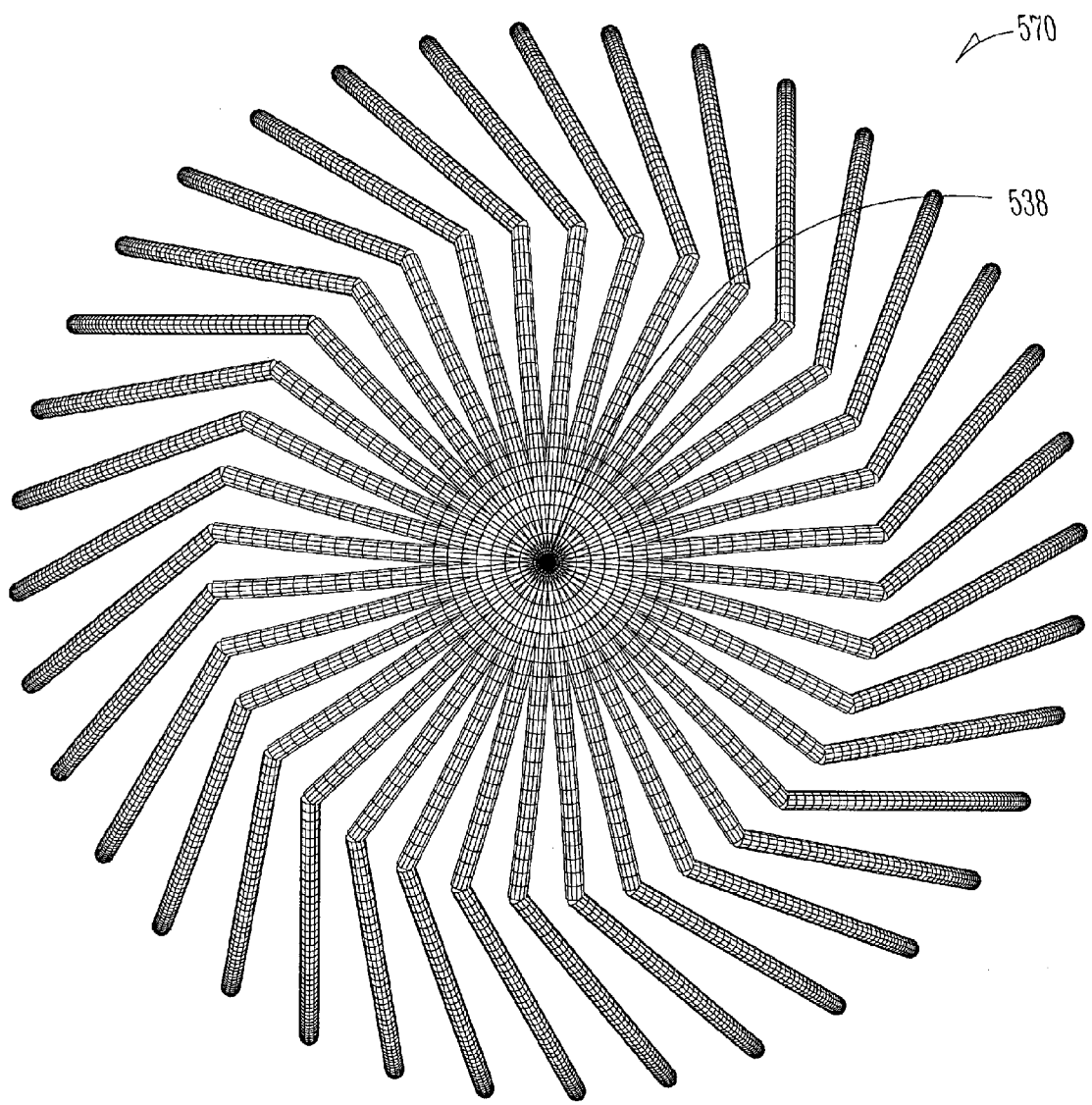
FIGS. 5A-5B illustrate top and perspective views, respectively, of gravitating ray camera sweep paths according to various embodiments of the invention.
Figure 5B:
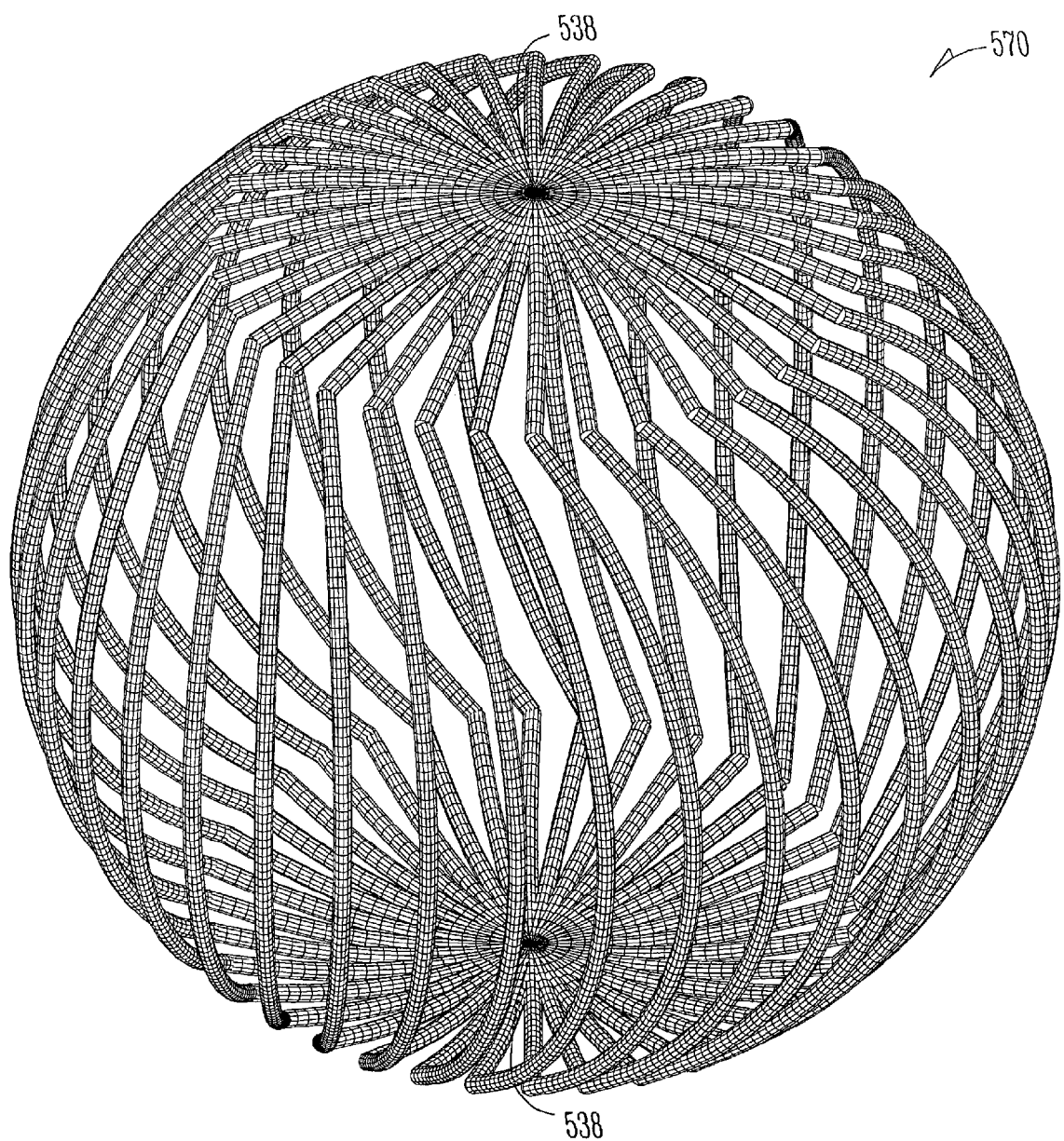

FIGS. 5A-5B illustrate top and perspective views, respectively, of gravitating ray camera sweep paths 570 according to various embodiments of the invention. As is the case with convergence, gravitation may also be performed according to a simple linear interpolation or using more complex mathematical models (e.g. quadratic, logarithmic, etc). Gravitation can be performed across the entire 90° camera inclination sweep approaching the apex 538, or across a smaller section of the sweep. For example, FIGS. 5A and 5B illustrate top and perspective views, respectively, of camera sweep paths 570 associated with linearly gravitating capture ray origins towards the center of the inter-ocular circle after the inclination has reached 60°. Gradual gravitation of the capture ray origin may operate to more effectively fill in missing apex imagery in a substantially seamless fashion than other techniques.

It should be noted that in some embodiments, use of the gravitation technique may result in degraded stereoscopy at the spherical apexes. For example, at the apex point, the capture ray origins may no longer be positioned along the inter-ocular circle. If this is the case, the left and right eye rays at that position may be identical, producing no stereoscopic effect. The precise pattern of the stereoscopic degradation depends on the mathematical model that defines the capture ray origin degradation. Using the sweep pattern of FIGS. 5A and 5B as an example, the desired stereoscopic separation can be maintained until 60° inclination (e.g., at a pitch position=±60 degrees with respect to the equator of the spherical image) has been reached, after which the stereoscopic separation will diminish linearly towards the apex point. For many applications, this type of stereoscopic degradation is acceptable, particularly when compared to the apex distortions apparent with previously available methods.

Since the gravitation technique permits the apex rays to converge to the same origins and orientations, imagery may be more consistently acquired as changes occur in the surrounding environment. Parallax distortions may be reduced or eliminated. Thus, the gravitation technique may be useful in computer graphics environments, as well as in the implementation of physical image capture devices.

To simplify viewing, the acquired images may be stored in an equirectangular image format, even though the image data formulation is not strictly equirectangular in nature. For example, if the equirectangular image format stores an entire sphere's worth of image data according to an angular positioning scheme, then each image pixel coordinate (x, y) may have a corresponding spherical angular coordinate (yaw, pitch). The horizontal image coordinate may correspond to a yaw position, and the vertical image coordinate may correspond to a pitch position, for example. Thus, each eye's image may be stored in the same equirectangular format such that pixel (x,y) in each eye's image corresponds to what each eye should see when looking in that direction. The pitch, yaw coordinates may be associated with a particular viewing or "viewer's head" orientation.

Image processing and storage efficiency for spherical image formats may be improved if image data is captured across the spherical surface in a more evenly distributed fashion. For example, a number of approaches to subdividing spheres may begin with one of the platonic solids, including those polyhedra having faces with equal area, equal edges, and equal angles. Examples include tetrahedrons, hexahedrons, octahedrons, dodecahedrons, and icosahedrons. Various mathematical techniques, known to those of skill in the art, may be used to generate substantially uniformly tesellated spherical surfaces based on these polyhedra. Any such representation may be used to implement the techniques described herein.

In some embodiments, a spherical surface may be divided into substantially equally tessellated polygons, such as triangles. The image data from a pair of triangles may subsequently be combined and stored in a substantially rectangular format in computer memory. A "triangle", "triangular image", or "triangle image" may refer to image data included in a triangular portion of a substantially uniformly tessellated spherical surface, such as an omniscopic spherical image. A "rectangle", "rectangular image", or "rectangle image" may comprise a combination of two triangle images. The triangular images may both be taken from a single omniscopic image set, or as a stereo pair: one from a left eye omniscopic spherical image, and one from a right eye omniscopic spherical image, as part of an omni-stereo image set.

It should be noted that the image data included in the rectangular images does not necessarily have to be stored as a "physical rectangle" or rectangular matrix in memory, although that is certainly an option. Rather, "storing a pair of triangles as a convex quadrilateral" can mean that data from the pair of triangles is combined in some fashion, and then stored as a unitary combination of data, accessible as a unit of data that may be used to reproduce the image information associated with that particular pair of triangles. Thus, the image data from the pair of triangles may be interleaved, compressed, intermingled, or re-arranged in a number of ways to form a unit that can be stored, accessed, and processed as a unified whole.

Figure 6:
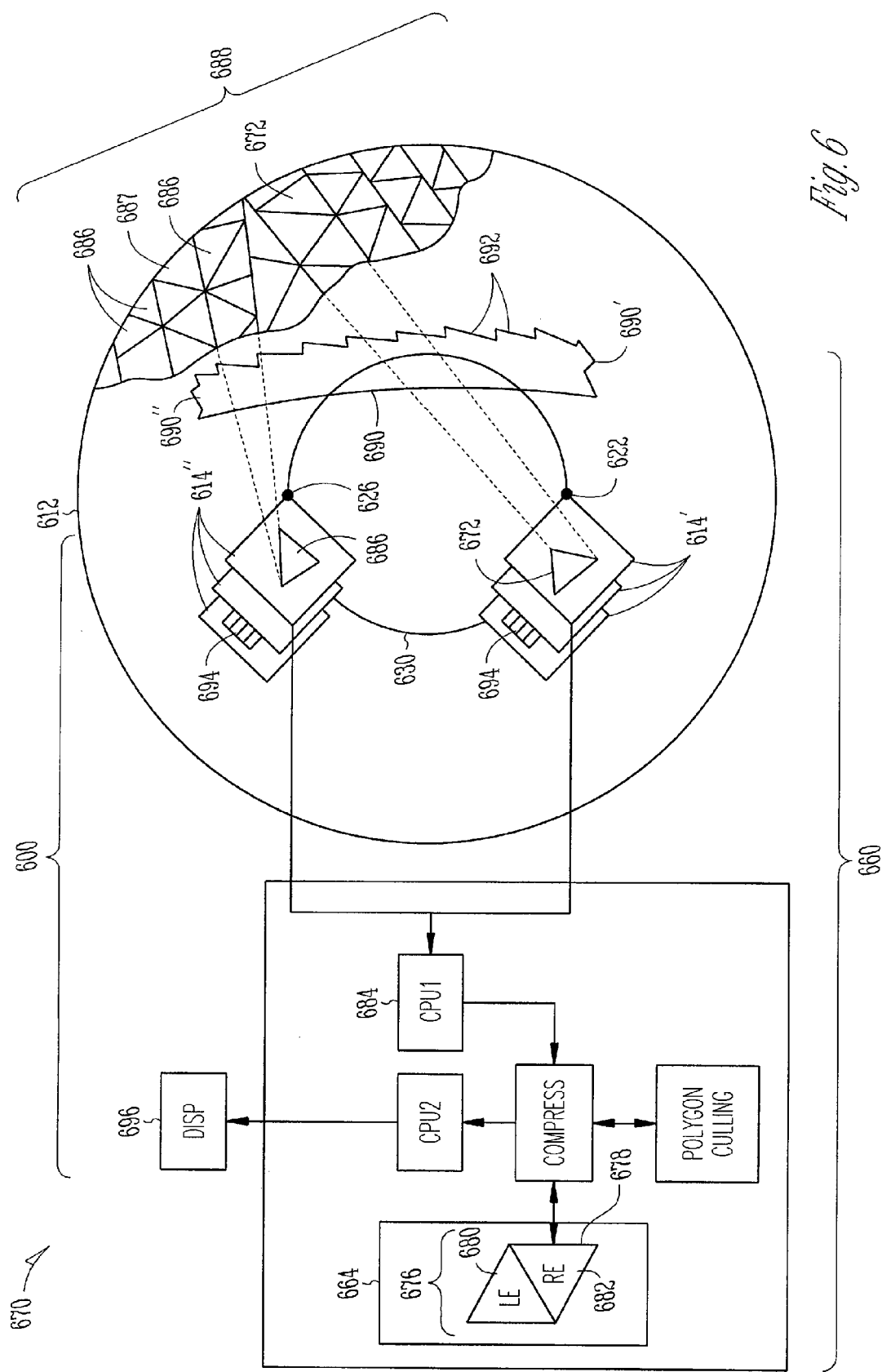
FIG. 6 is a block diagram illustrating apparatus and systems according to various embodiments of the invention.

FIG. 6 is a block diagram illustrating apparatus 600, 660 and systems 670 according to various embodiments of the invention, which may operate in the manner described above. Both the convergence and gravitation techniques may be implemented using a single (or multiple) motor controlled or otherwise movable capture media 614', 614", as well as a plurality of stationary image capture media 614', 614" to capture spherical omniscopic and omni-stereo still images 612. Multiple images may be captured, and then displayed in sequence to create moving omniscopic and omni-stereo movies.

The apparatus 660 may include image storage media 664, such as semiconductor memory, or magnetic/optical disks, or combinations of these, to store portions 672 of a spherical image 612 as a pair of triangles 676 included in a convex quadrilateral 678. In some embodiments, such as a camera, including a video camera, the apparatus 660 may include one or more image capture media 614', 614" to capture a subset of the portion 672 including at least one of the pair of triangles 676. As noted previously, image capture media 614', 614" may include photosensitive solid state devices, such as CMOS sensors, and CCDs, among others.

It should be noted that the spherical image 612 may comprise a monoscopic spherical image or a stereoscopic spherical (e.g., omni-stereo) image. In the case of a monoscopic spherical image 612, the pair of triangles 676 may be adjacent each other in a substantially uniformly tessellated portion of the spherical image 612. Some embodiments the apparatus 660 may include a processor 684 to control repetitive acquisition of other portions 686 of the spherical image 612 and storage of the other portions 686 in the image storage medium 664.

Thus, referring now to FIGS. 1A-1F and FIG. 6, it can be seen that in some embodiments, an apparatus 100, 660 may include a first image capture medium 114', 614' to capture a first portion 672 of a spherical image 612. The first image capture medium 114', 614' may be located so as to be substantially perpendicular to a converging ray 118' originating at a first viewpoint 122, 622 on an inter-ocular circle 130, 630, with a convergence angle 142' between zero and ninety degrees from a parallel viewpoint baseline position 146 that includes a non-converging ray 144' originating at the first viewpoint 122, 622. See, for example, FIGS. 1B and 1C. The media 114', 114" may be moved to the orientation described, or be fixed at that orientation. The apparatus 100, 660 may also include a second image capture medium 114" located at a second viewpoint 126, 626 on the inter-ocular circle 130, 630 to capture a second portion 686 of the spherical image.

The apparatus 100, 660 may include an image storage medium 664 to store a subset of the first portion 672 and a subset of the second portion 686 as a pair of triangles 676, perhaps included in a convex quadrilateral 678. The pair of triangles 676 may be included in a plurality of triangles 688 forming a substantially uniformly tessellated portion of the spherical image 612, and may, for stereoscopic applications, include a first triangle 680 associated with a left eye view (e.g., stored as a subset of portion 672), and a second triangle 682 associated with a right eye view (e.g., stored as a subset of portion 686). In monoscopic applications, the pair of triangles 676 may be located adjacent each other in the substantially uniformly tessellated portion of the spherical image 612.

As has been made apparent in FIGS. 1A-1F, one or more image capture media 114', 114", 614', 614" may be oriented so as to be substantially perpendicular to a converging ray 118', 118" originating at the second viewpoint 126, 626 and having a convergence angle 142" between zero and ninety degrees from a parallel viewpoint baseline position 146 that includes a non-converging ray 144" originating at the second viewpoint 126, 626.

Various convergence angles 142', 142" may be achieved. For example, in some embodiments, convergence angle 142' may be substantially equal to convergence angle 142". In some embodiments, convergence angle 142' may be substantially unequal to convergence angle 142". In some embodiments, the convergence angles 142', 142" may be substantially equal for a first portion of a camera sweep operation, and substantially unequal for a second portion of the camera sweep or spherical image capture operation. It should be noted that a "camera sweep operation" may include physically moving image capture media 614', 614" in space, or acquiring image data from a plurality of stationary image capture media 614', 614", such as via electronic multiplexing, where a multiplexer or some other switching arrangement controlled by the processor 684 influences the order of image acquisition.

Thus, in some embodiments, the apparatus 100, 660 may include a plurality of additional image capture media 614', 614" located along a substantially circular path (e.g., the inter-ocular circle 630, or paths similar to or identical to the sweep paths 258, 362, and 570 of FIGS. 2, 3, and 5, respectively) wherein the plurality of additional image capture media 614', 614" includes a corresponding plurality of orientations, ranging from substantially perpendicular to the non-converging rays 144', 144" to substantially perpendicular to the converging rays 118', 118". The convergence angle 142', 142" may be approximately determined by a convergence point 134 located in a plane including the converging ray 118' (originating at the first viewpoint 122) and a mirror image of the converging ray 118" that intersects the converging ray 118' and originates at the second viewpoint 126.

As has been noted, convergence angles 142', 142" may range between 0 and 90 degrees. In some embodiments, the convergence angles 142', 142" may range between 1 and 89 degrees. In some embodiments, the convergence angles 142', 142" may range between 1 and 85 degrees. In some embodiments, the convergence angles 142', 142" may range between 5 and 85 degrees.

Referring now to FIGS. 4A-4D and 6, it can be seen that in some embodiments, a gravitation apparatus 400, 600 may include a first image capture medium 414', 614' to capture a first portion 672 of a spherical image 612, wherein the first image capture medium 414', 614' is substantially perpendicular to a non-converging ray 444' originating at a first viewpoint 422, 622 at the first endpoint of a diameter D defining an inter-ocular circle 430, 630. The apparatus 400, 600 may include a second image capture medium 414' to capture a second portion 686 of the spherical image 612, wherein the second image capture medium 414''' is substantially perpendicular to a non-converging ray 464' originating on a first point 466' of the diameter D between the first endpoint 422, 622 and the center 468 of the inter-ocular circle 430, 630. The spherical image 612 may comprise an omni-stereoscopic image.

In some embodiments, the apparatus 600 may include multiple image capture media, such as a third image capture medium 414", 614" to capture a third portion 687 of the spherical image 612, wherein the third image capture medium 414" is substantially perpendicular to a non-converging ray 444" originating at a second viewpoint 426, 626 at a second endpoint of the diameter D defining the inter-ocular circle 430, 630. The apparatus 600 may also include an image storage medium 664 to store a subset of the first portion 672 and a subset of the second portion 686 as a pair of triangles 676 included in a convex quadrilateral 678.

Other embodiments may be realized. For example, a system 670 may include one or more apparatus 100, 400, 600, 660, described previously. The system 670 may also include one or more lenses 690 (perhaps divided into multiple lenses 690', 690") to focus the first portion 672 of the spherical image 612 on the first image capture medium 614', and one or more lenses 690 (may be the same lens 690, or one of the divided lenses 690', 690") to focus the second portion 686 of the spherical image 612 on the second image capture medium 614". The lens 690 may include a plurality of facets 692 to focus on corresponding groups of pixels 694 forming a portion of the image capture media 614', 614". The corresponding groups of pixels 694 may be defined by N×N pixel arrays for N comprising a positive integer (e.g., 1×1, 2×2, 3×3, etc.).

In embodiments of a system 670 that operates via gravitation, the system 670 may include a plurality of additional image capture media 614''' located along a substantially circular path 630, wherein the plurality of additional image capture media include a corresponding plurality of orientations, ranging between the first viewpoint 422, 622 and the second viewpoint 426, 626 along the diameter D of the inter-ocular circle 430, 630.

In some embodiments, the system 670 may include a viewfinder 696 to view a subset of the first portion 672 and/or a subset of the second portion 686. For example, if the system 670 includes a movie camera, the viewfinder 696 may comprise a monoscopic or stereoscopic viewfinder to view a subset of portions of the spherical image.

The apparatus 100, 400, 600, 660; spherical image 112, 612; image capture media 114, 114', 114", 414', 414", 414''', 614', 614"; converging rays 118, 118', 118"; viewpoints 122, 126, 422, 426, 622, 626; inter-ocular circles 130, 430, 630; convergence point 134; apexes 138, 238, 338, 538; convergence angles 142', 142"; baseline positions 146, 446; non-converging rays 144', 144", 444', 444"; image portions 150, 672, 686, 687; pitch angles 152', 152", 452', 452"; yaw angles 154', 154", 454', 454"; twist angles 156', 156"; sweep paths 258, 260, 362, 570; gravitating capture rays 464', 464"; origins 466', 466"; center 468; inter-ocular distance portions 470', 470"; storage media 664; systems 670; triangles 676; convex quadrilateral 678; processor 684; triangles 688; lenses 690, 690', 690"; facets 692; groups of pixels 694; viewfinder 696; and diameter D may all be characterized as "modules" herein.

Such modules may include hardware circuitry, processors, memory circuits, software program modules and objects, firmware, and/or combinations thereof, as desired by the architect of the apparatus 100, 400, 660 and systems 670, and as appropriate for particular implementations of various embodiments. For example, such modules may be included in a system operation simulation package, such as a software electrical signal simulation package, a power usage simulation package, an image processing package; a movie display package; a power/heat dissipation simulation package, a signal transmission-reception simulation package, and/or a combination of software and hardware used to simulate the operation of various potential embodiments.

It should also be understood that the apparatus and systems of various embodiments can be used in applications other than acquisition, processing, and display of omni-stereo images, and thus, various embodiments are not to be so limited. The illustrations of apparatus 100, 400, 660 and systems 670 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, cameras, projectors, vehicles, and others. Some embodiments include a number of methods.

Figures 7A, 7B:
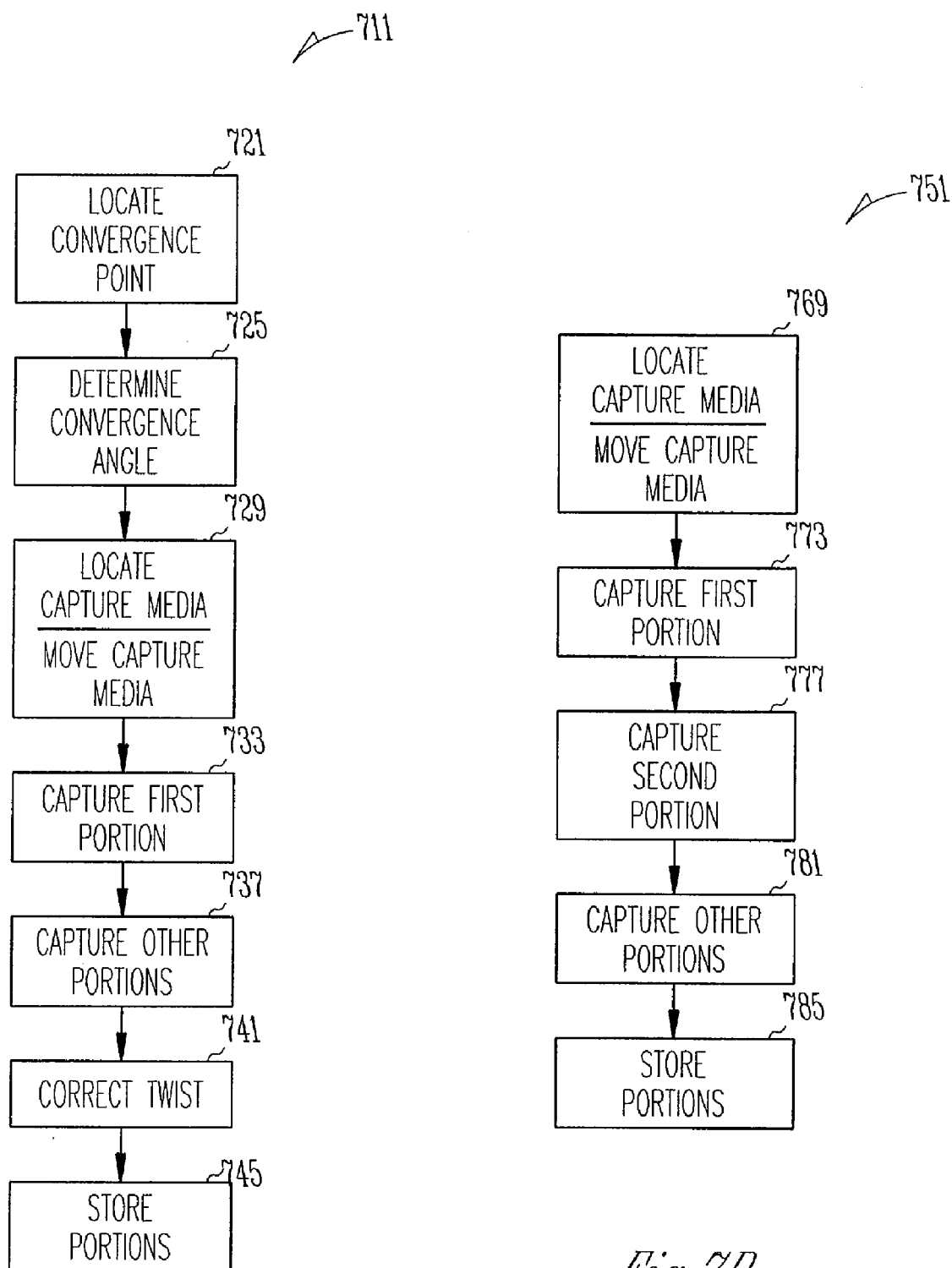
FIGS. 7A-7B are flow diagrams illustrating several methods according to various embodiments of the invention.

For example, FIGS. 7A-7B are flow diagrams illustrating several methods according to various embodiments of the invention. Thus, a method 711 may (optionally) begin at block 721 with locating a convergence point at the surface of an object visible to first and second viewpoints, perhaps located on an inter-ocular circle (e.g., to a left and right eye, for example). The method 711 may continue at block 725 with determining a convergence angle by locating the convergence point in a plane including a converging ray and a mirror image of the converging ray that intersects the converging ray and originates at the second viewpoint on an inter-ocular circle.

In some embodiments, the method 711 at block 729 includes moving image capture media, or locating a plurality of capture media, so as to properly orient the media for image capture. For example, the media may be moved or located so that image capture rays originating at selected viewpoints intersect at a selected convergence point as the media are manipulated (e.g., physically and/or electronically) to capture spherical imagery. Thus, the method 711 at block 729 may include sweeping an image capture medium about a substantially circular path; and moving the image capture medium from an orientation substantially perpendicular to a non-converging ray to substantially perpendicular to a converging ray, as shown and described with respect to FIGS. 1A-1F.

In some embodiments, a full pitch angle sweep may be accomplished, repeated at a succession of yaw positions to form a complete spherical image. In some embodiments, a full yaw angle sweep may be performed, and repeated at a succession of pitch positions to form a complete spherical image. Combinations of these two techniques (e.g., partial yaw and pitch sweeps) may also be used.

In some embodiments, moving the image capture medium may further include maintaining the image capture medium at the orientation substantially perpendicular to the non-converging ray for a first portion of the substantially circular path, and moving the image capture medium from the orientation substantially perpendicular to the non-converging ray to substantially perpendicular to the converging ray for a second portion of the substantially circular path (e.g., as shown in FIGS. 2 and 3).

In some embodiments, such as where a plurality of stationary image capture media are used to capture imagery, the method 711 at block 729 may include locating a plurality of additional image capture media along a substantially circular path. The plurality of additional image capture media may be located so as to include a corresponding plurality of orientations, ranging between an orientation substantially perpendicular to the non-converging ray to an orientation substantially perpendicular to the converging ray.

The method 711 at block 733 may include capturing a portion of a spherical image, such as a monoscopic, stereoscopic, or an omni-stereoscopic image, using a first image capture medium substantially perpendicular to a converging ray originating at a first viewpoint on an inter-ocular circle, with a convergence angle between zero and ninety degrees from a parallel viewpoint baseline position that includes a non-converging ray originating at the first viewpoint. At block 737, the method 711 may include capturing another portion of the image, such as an omni-stereoscopic image, using a second image capture medium substantially perpendicular to a converging ray originating at a second viewpoint on the inter-ocular circle and having a convergence angle between zero and ninety degrees from a parallel viewpoint baseline position that includes a non-converging ray originating at the second viewpoint. The "first" and "second" image capture media may comprise two separate media located at two distinct physical locations, or the same medium, physically moved through space to occupy two different locations.

In some embodiments, the method 711 may include rotating the first image capture medium by a selected yaw correction amount about an axis parallel to the converging ray, wherein the selected yaw correction amount is substantially equal to the convergence angle (or a portion of the ultimate extent of the convergence angle, perhaps based on the current pitch position). This may be done to correct image twist distortion, as described previously, at block 741. The method 711 may conclude at block 745 with storing one or more portions of an image, such as an omni-stereoscopic image, in a storage medium as one of a pair of triangles included in a convex quadrilateral. As spherical image capture operations occur, twist correction may occur prior to, after, or substantially simultaneously at the same time as the yaw and pitch movements used to orient the image capture media during sweep operations. Of course, if stationary media are used to acquire spherical imagery, then the twist correction can be subtracted or added to the desired yaw orientation.

As noted previously, the triangles in each pair may be taken from image portions seen from a single viewpoint. However, a pair of triangles may also represent images taken from different viewpoints, such as where one or more pairs of triangles includes a first triangle associated with a left eye view, and a second triangle associated with a right eye view.

Other embodiments may be realized. For example, a method 751 at block 769 may include moving the image capture media, or locating a plurality of capture media, so as to properly orient the media for image capture. In this case, however, the movement or location of the media may be designed so as to gravitate the media capture rays (generally perpendicular to the capture plane of the media) toward the center of the inter-ocular circle. For example, the method 751 at block 769 may include moving an image capture medium along the diameter of an inter-ocular circle from a first endpoint (e.g., a first viewpoint) of the diameter to a point between the first endpoint and the center of the inter-ocular circle. During this activity, the image capture medium may be moved nonlinearly along the diameter from the first endpoint to the center of the circle along a substantially linear path. In some embodiments, instead of moving the media, or in addition to moving the media, the method 751 may include locating a plurality of additional image capture media along the diameter from the first endpoint to the center of the circle. This may occur when a plurality of stationary media are used for image capture, for example.

Thus, in some embodiments, the method 751 may include capturing a first portion of an image, such as a monoscopic, stereoscopic, or an omni-stereoscopic image, using an image capture medium located so as to be substantially perpendicular to a non-converging ray originating at a first endpoint of a diameter defining an inter-ocular circle at block 773. The method 751 may continue at block 777 with capturing a second portion of the image, such as an omni-stereoscopic image, using the image capture medium located so as to be substantially perpendicular to a non-converging ray originating at a point of the diameter between the first endpoint and the center of the inter-ocular circle.

In some embodiments, the method 751 may include capturing a plurality of other portions of the image, such as an omni-stereoscopic image, at block 781. This image capture may be accomplished using a single capture medium, physically moved between subsequent image capture locations, or a plurality of stationary image capture media, where image capture operation is electronically cycled between the individual media elements. Thus, the method 751 may include capturing another portion of the image, such as an omni-stereoscopic image, using another image capture medium substantially perpendicular to a non-converging ray originating at a second viewpoint located at a second endpoint of the diameter defining the inter-ocular circle.

In some embodiments (e.g., where stationary capture media image capture is employed), the method 751 may include locating a plurality of other image capture media along the diameter from the second endpoint to a second point of the diameter between the second non-central endpoint and the center of the inter-ocular circle, and capturing a plurality of additional portions of the omni-stereoscopic image using the plurality of other image capture media. In some embodiments (e.g., where moving capture media image capture are used), the method 751 may include moving the other image capture medium along the diameter from the second endpoint to a second point of the diameter between the second endpoint and the center of the inter-ocular circle, and capturing a plurality of additional portions of the omni-stereoscopic image. The method 751 may conclude at block 785 with storing one or more portions of the image in a storage medium as one of a pair of triangles included in a convex quadrilateral.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Figure 8:
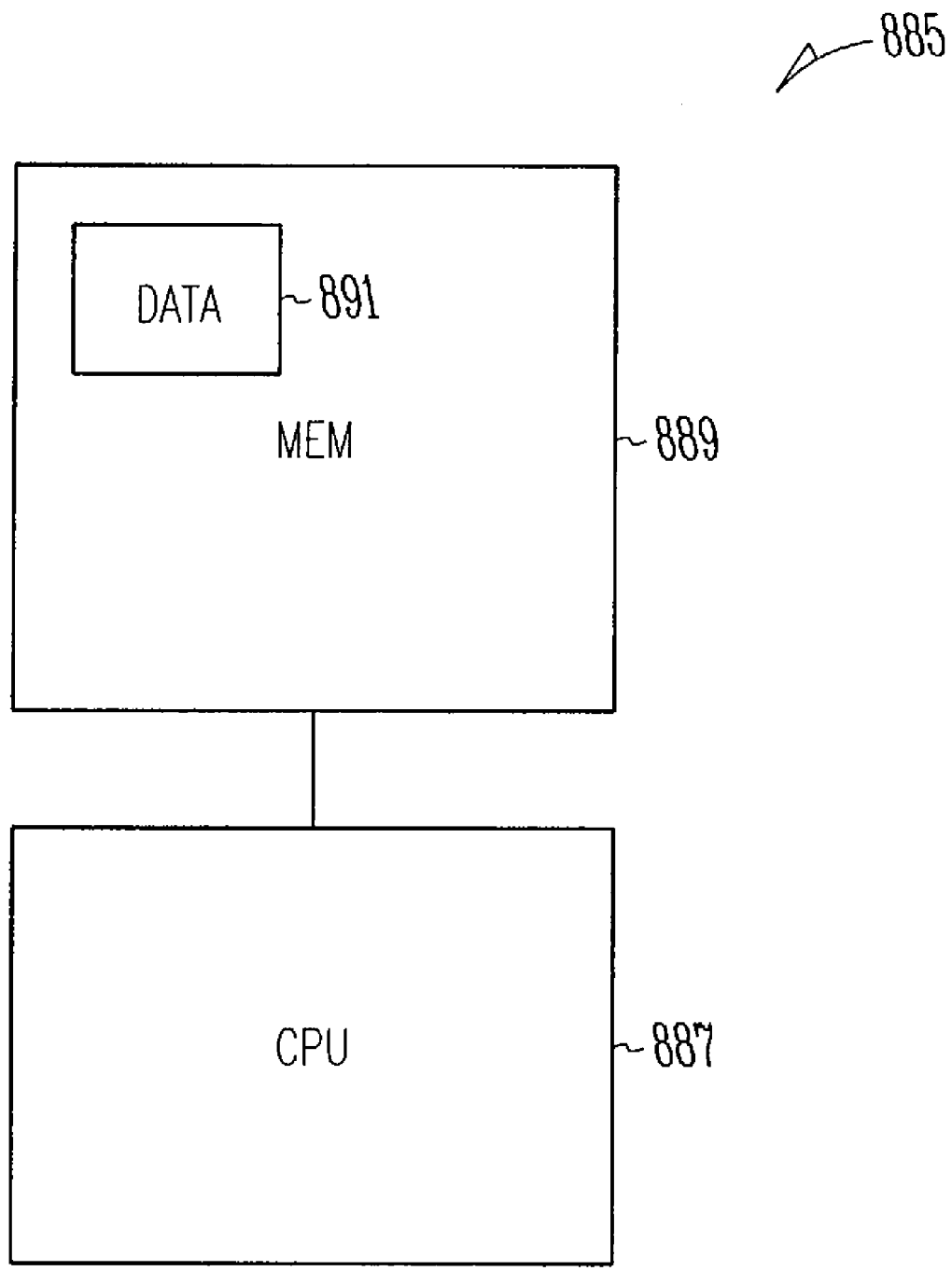
FIG. 8 is a block diagram of an article according to various embodiments of the invention.

Thus, other embodiments may be realized. For example, FIG. 8 is a block diagram of an article 885 according to various embodiments of the invention. Examples of such embodiments include a computer, a memory system, a magnetic or optical disk, some other storage device, and/or any type of electronic device or system. The article 885 may include a processor 887 coupled to a machine-accessible medium such as a memory 889 (e.g., a memory including an electrical, optical, or electromagnetic conductor) having associated information 891 (e.g., computer program instructions and/or data), which, when accessed, results in a machine (e.g., the processor 887) performing such actions as capturing a portion of a spherical image (e.g., an omni-stereoscopic image) using a first image capture medium substantially perpendicular to a converging ray originating at a first viewpoint on an inter-ocular circle. The converging ray may have a convergence angle between zero and ninety degrees from a parallel viewpoint baseline position that includes a non-converging ray originating at the first viewpoint.

Further activities may include storing the portion (or a subset of the portion) of the spherical image in a storage medium as one of a pair of triangles included in a convex quadrilateral, as well as capturing another portion of the spherical image using a second image capture medium, which may in turn be located so as to be substantially perpendicular to a converging ray originating at a second viewpoint on the inter-ocular circle, with a convergence angle between zero and ninety degrees from a parallel viewpoint baseline position that includes a non-converging ray originating at the second viewpoint.

In some embodiments, the article 885 may include a processor 887 coupled to a machine-accessible medium such as a memory 889 having associated information 891 which, when accessed, results in a machine performing such actions as capturing a first portion of a spherical image (e.g., an omni-stereoscopic image) using an image capture medium substantially perpendicular to a non-converging ray originating at a first viewpoint at a first endpoint of a diameter defining an inter-ocular circle, and capturing a second portion of the spherical image using another image capture medium substantially perpendicular to a non-converging ray originating on a first point of the diameter between the first endpoint and a center of the inter-ocular circle.

Further actions may include locating a plurality of additional image capture media along the diameter from the first endpoint to the first point, and capturing a plurality of other portions of the spherical image using the plurality of additional image capture media. Additional actions may include capturing another portion of the spherical image using another image capture medium substantially perpendicular to a non-converging ray originating at a second viewpoint at a second endpoint of the diameter defining the inter-ocular circle.

Implementing the apparatus, systems, and methods disclosed herein may significantly reduce the amount of distortion present in acquired and stored data that is used to display monoscopic and stereoscopic spherical images, especially as viewing directions tend toward the apexes of the spherical imagery.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. An apparatus, including:
a first image-capture medium to capture a first portion of a spherical image, wherein the first image-capture medium is substantially perpendicular to a first converging ray that originates at a first viewpoint on an inter-ocular circle and having a first convergence angle between zero and ninety degrees from a first non-converging ray that originates at the first viewpoint; and a second image-capture medium located at a second viewpoint on the inter-ocular circle to capture a second portion of the spherical image, wherein the second image-capture medium is substantially perpendicular to a second converging ray that originates at the second viewpoint and having a second convergence angle between zero and ninety degrees from a second non-converging ray that originates at the second viewpoint, and wherein the second non-converging ray is parallel to the first non-converging ray.

2. The apparatus of claim 1, wherein the spherical image comprises an omni-stereoscopic image.

3. The apparatus of claim 1, further comprising:
an image-storage medium to store a subset of the first portion and a subset of the second portion as a pair of triangles included in a convex quadrilateral.

4. The apparatus of claim 1, further comprising:
an image-storage medium to store a subset of the first portion and a subset of the second portion as a pair of triangles included in a convex quadrilateral, wherein the pair of triangles includes a first triangle associated with a left-eye view, and a second triangle associated with a right-eye view.

5. The apparatus of claim 1, further comprising:
an image-storage medium to store a subset of the first portion and a subset of the second portion as a pair of triangles included in a convex quadrilateral, wherein the pair of triangles is included in a plurality of triangles forming a substantially uniformly tessellated portion of the spherical image.

6. The apparatus of claim 5, wherein the pair of triangles are adjacent each other in the substantially uniformly tessellated portion of the spherical image.

7. The apparatus of claim 1, further comprising:
an image-storage medium; and
a processor to control storage of the first portion and the second portion on the image-storage medium, and to control repetitive acquisition of other portions of the spherical image and storage of the other portions on the image-storage medium.

8. The apparatus of claim 1, further comprising:
a lens to focus the first portion of the spherical image on the first image-capture medium.

9. The apparatus of claim 8, wherein the lens comprises a plurality of facets to focus on corresponding groups of pixels included in the first image-capture medium, and wherein the corresponding groups are defined by N×N pixel arrays for N comprising a positive integer.

10. The apparatus of claim 8, further including:
a viewfinder to view a subset of the first portion.

11. The apparatus of claim 8, further including:
a plurality of additional image-capture media located along a substantially circular path, wherein the plurality of additional image-capture media includes a corresponding plurality of orientations, ranging from substantially perpendicular to the non-converging ray to substantially perpendicular to the converging ray.

12. The apparatus of claim 8, wherein the convergence angle is approximately determined by a convergence point located in a plane including the converging ray and a minor image of the converging ray that intersects the converging ray and originates at the second viewpoint.

13. A method, including:
capturing a first portion of a spherical image using a first image-capture medium substantially perpendicular to a first converging ray originating at a first viewpoint on an inter-ocular circle and having a first convergence angle between zero and ninety degrees from a first non-converging ray originating at the first viewpoint, and capturing a second portion of the spherical image using a second image-capture medium substantially perpendicular to a second converging ray originating at a second viewpoint on the inter-ocular circle and having a second convergence angle between zero and ninety degrees from a second non-converging ray originating at the second viewpoint, wherein the second non-converging ray is parallel to the first non-converging ray.

14. The method of claim 13, further including:
storing the first portion of the spherical image in a storage medium as a first one of a pair of triangles included in a convex quadrilateral, and storing the second portion of the spherical image in a storage medium as a second one of the pair of triangles included in the convex quadrilateral.

15. The method of claim 13, further including:
determining the convergence angle by locating a convergence point in a plane including the converging ray and a minor image of the converging ray that intersects the converging ray and originates in a second viewpoint on the inter-ocular circle.

16. The method of claim 13, further including:
determining the convergence angle by locating a convergence point in a plane including the converging ray and a minor image of the converging ray that intersects the converging ray and originates in a second viewpoint on the inter-ocular circle; and
locating the convergence point at a surface of an object visible to the first and second viewpoints.

17. The method of claim 13, further including:
rotating the first image-capture medium by a selected yaw correction amount about an axis parallel to the converging ray, wherein the selected yaw correction amount is substantially equal to a selected portion of the convergence angle.

18. The method of claim 13, further including:
sweeping the first image-capture medium about a substantially circular path; and
moving the first image-capture medium from an orientation substantially perpendicular to the non-converging ray to substantially perpendicular to the converging ray.

19. The method of claim 18, wherein moving the first image capture medium further includes:
maintaining the first image-capture medium at the orientation substantially perpendicular to the non-converging ray for a first portion of the substantially circular path; and
moving the first image-capture medium from the orientation substantially perpendicular to the non-converging ray to substantially perpendicular to the converging ray for a second portion of the substantially circular path.

20. The method of claim 13, further including:
locating a plurality of additional image-capture media along a substantially circular path, wherein the plurality of additional image-capture media includes a corresponding plurality of orientations, ranging between an orientation substantially perpendicular to the non-converging ray to an orientation substantially perpendicular to the converging ray.

21. A non-transitory computer-readable medium having associated information embedded thereon, wherein the information includes computer program instructions that, when accessed and executed by a machine, result in the machine performing a method comprising:

capturing a first portion of a spherical image using a first image-capture medium substantially perpendicular to a first converging ray originating at a first viewpoint on an inter-ocular circle and having a first convergence angle between zero and ninety degrees from a first non-converging ray originating at the first viewpoint, and capturing a second portion of the spherical image using a second image-capture medium substantially perpendicular to a second converging ray originating at a second viewpoint on the inter-ocular circle and having a second convergence angle between zero and ninety degrees from a second non-converging ray originating at the second viewpoint, wherein the second non-converging ray is parallel to the first non-converging ray.

22. The non-transitory computer-readable medium of claim 21, wherein the information includes computer program instructions that, when accessed and executed by the machine, results in the machine performing:

storing the first portion of the spherical image in a storage medium as a first one of a pair of triangles included in a convex quadrilateral, and storing the second portion of the spherical image in a storage medium as a second one of the pair of triangles included in the convex quadrilateral.

23. The apparatus of claim 1, wherein the first image-capture medium is further configured to capture a third portion of the spherical image when the first image-capture medium is substantially perpendicular to a third converging ray that originates at the first viewpoint on the inter-ocular circle and that has both a non-zero pitch angle and a third convergence angle from the first non-converging ray, and wherein the third convergence angle is larger than the first convergence angle; and wherein the second image-capture medium is further configured to capture a fourth portion of the spherical image when the second image-capture medium is substantially perpendicular to a fourth converging ray that originates at the second viewpoint and that has both the non-zero pitch angle and a fourth convergence angle from the second non-converging ray.

24. The apparatus of claim 1, wherein the first image-capture medium is further configured to capture a third portion of the spherical image when the first image-capture medium is substantially perpendicular to a third converging ray that originates at the first viewpoint on the inter-ocular circle and that has a non-zero pitch angle and a non-zero yaw angle and a third convergence angle from the first non-converging ray, and wherein the third convergence angle is larger than the first convergence angle; and wherein the second image-capture medium is further configured to capture a fourth portion of the spherical image when the second image-capture medium is substantially perpendicular to a fourth converging ray that originates at the second viewpoint and that has the non-zero pitch angle and the non-zero yaw angle and a fourth convergence angle from the second non-converging ray.

25. The non-transitory computer readable medium of claim 21, wherein the information includes computer program instructions that, when accessed and executed by the machine, result in the machine performing a method further comprising:

capturing a third portion of a spherical image using a first image-capture medium substantially perpendicular to a third converging ray originating at a first viewpoint on an inter-ocular circle and having a non-zero pitch angle and a non-zero yaw angle and a third convergence angle from the first non-converging ray, and wherein the third convergence angle is larger than the first convergence angle; and capturing a second portion of the spherical image using a second image-capture medium substantially perpendicular to a fourth converging ray originating at a second viewpoint on the inter-ocular circle and having the non-zero pitch angle and the non-zero yaw angle and a fourth convergence angle from the second non-converging ray.

\* \* \* \* \*